US012381339B2

(12) United States Patent
Eigner et al.

(10) Patent No.: US 12,381,339 B2
(45) Date of Patent: Aug. 5, 2025

(54) SHEATH-BONDING LINK BOX

(71) Applicant: Tyco Electronics Raychem GmbH, Ottobrunn (DE)

(72) Inventors: Alexander Eigner, Ottobrunn (DE); Mario Richter, Ottobrunn (DE)

(73) Assignee: Tyco Electronics Raychem GmbH, Ottobrunn (DE)

( * ) Notice: Subject to any disclaimer, the term of this patent is extended or adjusted under 35 U.S.C. 154(b) by 644 days.

(21) Appl. No.: 17/697,443

(22) Filed: Mar. 17, 2022

(65) Prior Publication Data

US 2022/0302613 A1 Sep. 22, 2022

(30) Foreign Application Priority Data

Mar. 17, 2021 (EP) .................................... 21163021

(51) Int. Cl.
*H01R 11/01* (2006.01)
*H01R 11/09* (2006.01)
*H02H 9/04* (2006.01)

(52) U.S. Cl.
CPC ............. *H01R 11/01* (2013.01); *H01R 11/09* (2013.01); *H02H 9/044* (2013.01)

(58) Field of Classification Search
CPC .......... H02G 3/08; H02G 3/081; H02G 15/10; H02G 15/1055; H02G 15/105;

(Continued)

(56) References Cited

U.S. PATENT DOCUMENTS 3,848,224 A * 11/1974 Olivero .................... H02G 3/16
174/59
10,096,984 B2 * 10/2018 Kimura ................ H01H 85/205
(Continued)

FOREIGN PATENT DOCUMENTS

CN 202840456 U 3/2013
KR 100971136 B1 7/2010
(Continued)

OTHER PUBLICATIONS

Extended European Search Report dated Sep. 3, 2021, corres. to Application No. 21163021.5-1201, 18 pages.

*Primary Examiner* — Angel R Estrada
(74) *Attorney, Agent, or Firm* — Barley Snyder

(57) ABSTRACT

A sheath-bonding link box includes a housing forming an enclosure defining an interior space. A plurality of electrically conductive connectors extend through the housing between an exterior of the enclosure and the interior space. The plurality of connectors each have an internal connecting portion positioned inside of the interior space and an external portion positioned outside of the enclosure. The internal connecting portion is electrically connectable to a functional link in the interior space. The external portion is dimensioned to be electrically connectable to a sheath-bonding lead. The internal connecting portions of the electrically conductive connectors and the functional links are mounted to at least one electrically insulating carrier unit. The carrier unit includes a plurality of receptacles, with each receptacle adapted to at least partly receive one of the functional links in an orientation along a longitudinal axis of the internal connecting portion of each connector.

20 Claims, 32 Drawing Sheets

(58) Field of Classification Search
CPC .......... H02G 3/088; H02G 3/086; H02G 3/00;
H05K 5/00; H05K 5/02; H01R 13/56;
H01R 4/305; H01R 4/72; H01R 9/223;
H01R 9/2408; H01R 9/2425; H01R
9/2458; H01R 9/18; H01R 9/00; H01R
13/46; H02H 9/044
USPC ................ 174/50, 520, 57, 58; 220/3.2, 3.3;
361/600, 601, 611
See application file for complete search history.

(56) References Cited

U.S. PATENT DOCUMENTS

| | | | |
|---|---|---|---|
| 10,401,416 B2* | 9/2019 | De Rai ............. | H02G 15/1055 |
| 10,498,127 B2* | 12/2019 | Czibur ................ | H02G 15/013 |
| 10,686,308 B1 | 6/2020 | Burks et al. | |
| 11,183,828 B1* | 11/2021 | Smith .................... | G01J 5/064 |

FOREIGN PATENT DOCUMENTS

| | | | |
|---|---|---|---|
| KR | 20110132174 A | 12/2011 | |
| WO | 2016190824 A1 | 12/2016 | |
| WO | 2020198875 A1 | 10/2020 | |

* cited by examiner

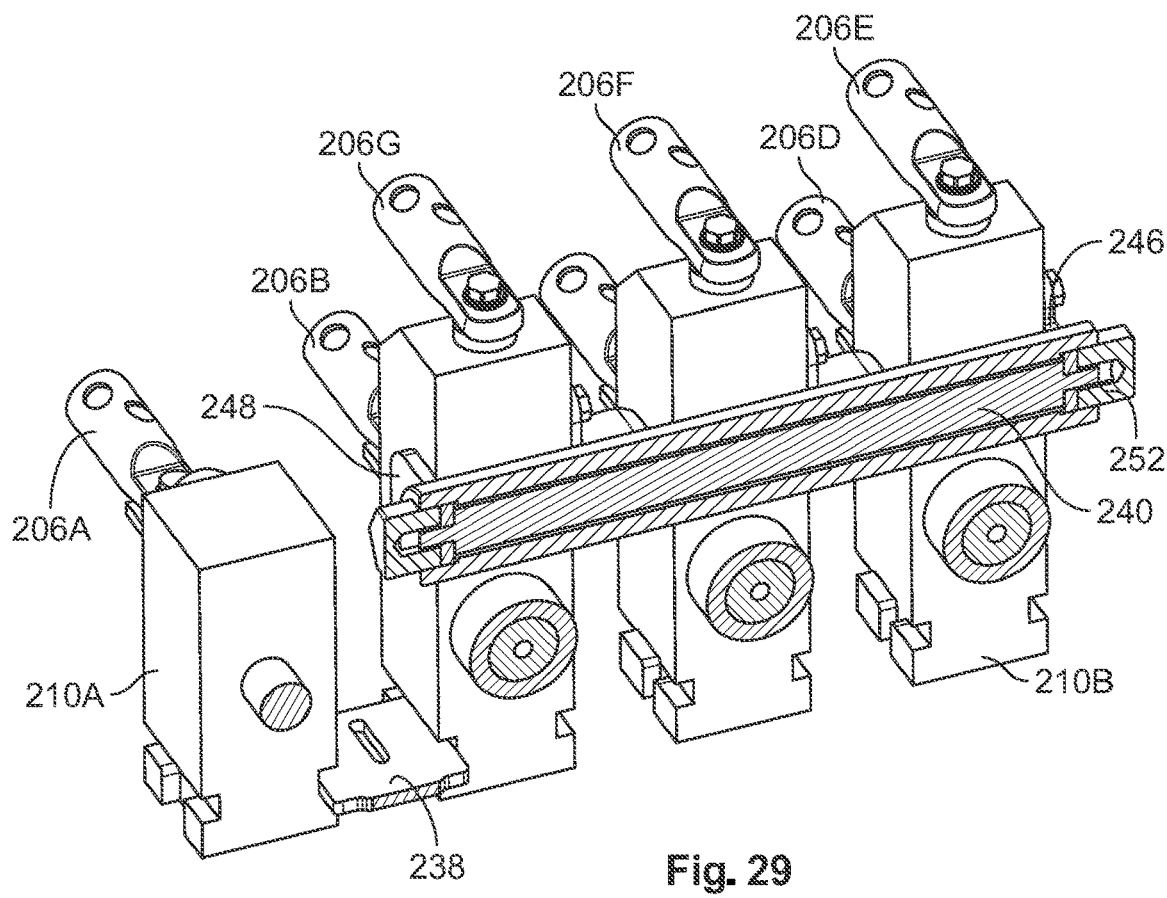
Fig. 29
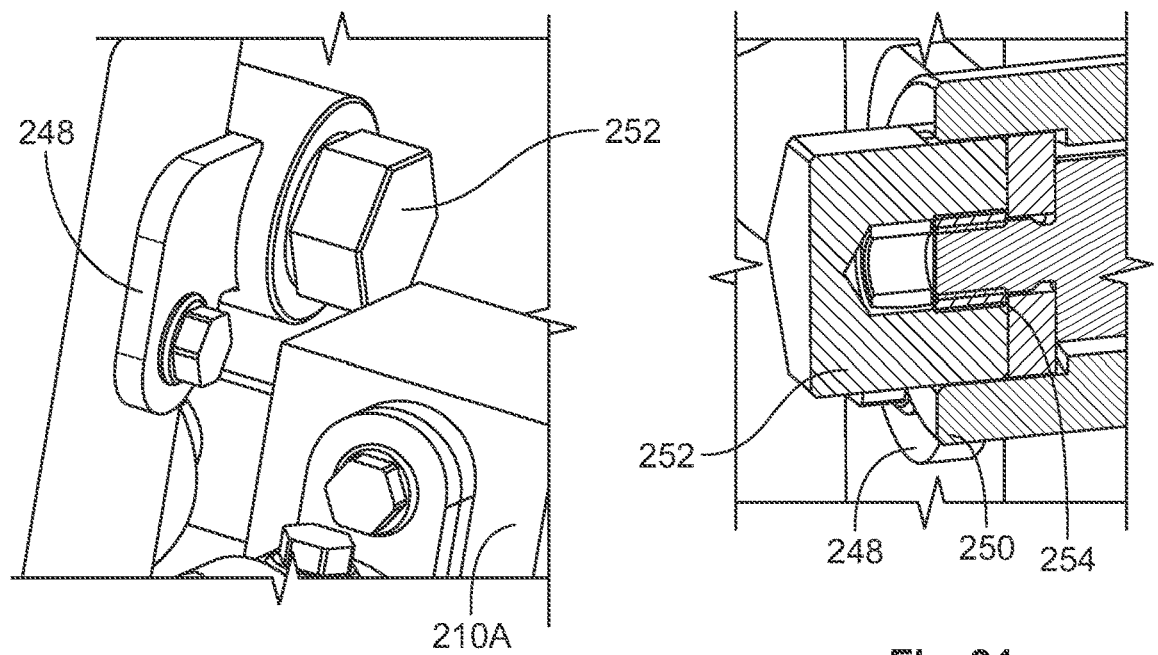
Fig. 30
Fig. 31

SHEATH-BONDING LINK BOX

CROSS-REFERENCE TO RELATED APPLICATIONS

This application claims the benefit of European Patent Application No. 21163021.5 filed on Mar. 17, 2021, the whole disclosure of which is incorporated herein by reference.

FIELD OF THE INVENTION

Embodiments of the present disclosure generally relate to electrical connectors, and more specifically, to a sheath-bonding link box for use with power cables.

BACKGROUND

In urban centers, electrical power is delivered via insulated power cables that are installed in underground pipes, conduits, and tunnels to traverse legs between stations that vary between a few hundred meters and about 20 kilometers in length. In some instances, the insulated power cables are installed in so-called station exits between a station and riser pole or other situations where it is necessary to connect an underground cable to an overhead line, in which case the length can be as short as 30 meters and even shorter. These power cables can also be laid in trenches excavated and backfilled with native soils or select materials or laid directly upon or jetted below the seabed. Each power cable carries a single phase, and three power cables are often grouped together forming a circuit to transmit alternating currents. The power cables installed on electric circuits operating at voltages equal to or higher than 5 kV include a metallic shield or sheath that is applied over the insulated core in order the confine the electric field to the cable and to provide a conductive path for system fault currents to return to their source. During operation, the current flowing in the cable conductor causes standing voltages to form and currents to flow along the sheaths of the power cables. These sheath currents raise the operating temperature of the cable and thus limit the current-carrying capacity of the cable and reduce the efficiency of power delivery.

In an effort to reduce these standing voltages and currents, the sheaths are divided into sheath sections that are then coupled via bonding leads in enclosures called link boxes that are configured to eliminate or reduce the magnitude of these standing voltages and currents. The bonding leads are brought into the link boxes via apertures in their housings and then the conductors thereof are exposed and coupled to internal connectors within the link boxes. These link boxes also serve to balance the voltage and currents across the sheaths to maximize the current carrying capacity of the power transmission system. Additionally, in certain applications, the link boxes may also contain voltage limiting devices known as surge voltage limiters ("SVLs") to limit voltages developed between the sheath and ground to protect the equipment and connected cable system from failure due to lightning strikes and other electrical system disturbances.

FIGS. 39 to 42 illustrate various interconnection schemes of such sheath-bonding link boxes (also referred to as "HV link boxes" in the following). In particular, FIG. 39 illustrates the direct grounding scheme without any SLVs. FIG. 40 shows as a circuit diagram the direct connection with SVLs in each current path. Further, FIG. 41 shows the cross-bonding interconnection scheme with direct grounding and FIG. 42 illustrates a further topology of direct grounding without SLVs.

In certain applications as shown in FIGS. 40 and 41, the link boxes contain SVLs to limit voltages developed between the sheath and ground to protect the equipment and connected cable system from failure due to lightning strikes and other electrical system disturbances. For instance, a known SLV may be a high-voltage surge arrester, for instance a non-linear metal-oxide resistor type surge arrester without spark gap as depicted in FIG. 43.

In summary, sheath-bonding link boxes are known to reduce the losses of a cable system by connecting the metallic sheaths (also called "screens") of HV cables. In particular, when using surge voltage limiters, the link box provides a secure housing for these components. Moreover, link boxes provide access to the cable screens, for instance for over sheath testing purposes, in case of direct buried joints. Furthermore, HV link boxes provide a defined point for the measurement of partial discharges, in particular at the coupling via the cable screen.

With existing link boxes, however, the problem occurs that for different sizes of functional links and in particular for different sizes of SVLs different link boxes have to be used. Moreover, existing link boxes often take up too much space. Current link boxes have no modular design and each link box is different. Especially the included SVLs determine with their lengths the design of the box.

Consequently, there is a need for a sheath-bonding link box which alleviates or overcomes the disadvantages of conventional sheath-bonding link boxes, that is universally applicable, economic to be produce, and small in size, at the same time providing a secure and reliable operation of a cable system.

SUMMARY

According to an embodiment of the present disclosure, a sheath-bonding link box includes a housing forming an enclosure defining an interior space. A plurality of electrically conductive connectors extend through the housing between an exterior of the enclosure and the interior space. The plurality of connectors each include an internal connecting portion positioned inside of the interior space and an external portion positioned outside of the enclosure. The internal connecting portion is electrically connectable to a functional link in the interior space. The external portion is dimensioned to be electrically connectable to a sheath-bonding lead. The internal connecting portions of the electrically conductive connectors and the functional links are mounted to at least one electrically insulating carrier unit. The carrier unit comprises a plurality of receptacles, with each receptacle being adapted to at least partly receive one of the functional links in an orientation along a longitudinal axis of the internal connecting portion of each connector.

BRIEF DESCRIPTION OF THE DRAWINGS

The invention will now be described by way of example with reference to the accompanying Figures, of which:

FIG. 29 is a further partly sectional perspective view of a part of the link box according to the third configuration;

FIG. 30 is a detail illustrating the crossbar connection of the third configuration;

FIG. 31 is a detail of FIG. 29;

DETAILED DESCRIPTION OF THE EMBODIMENTS

Figure 1:
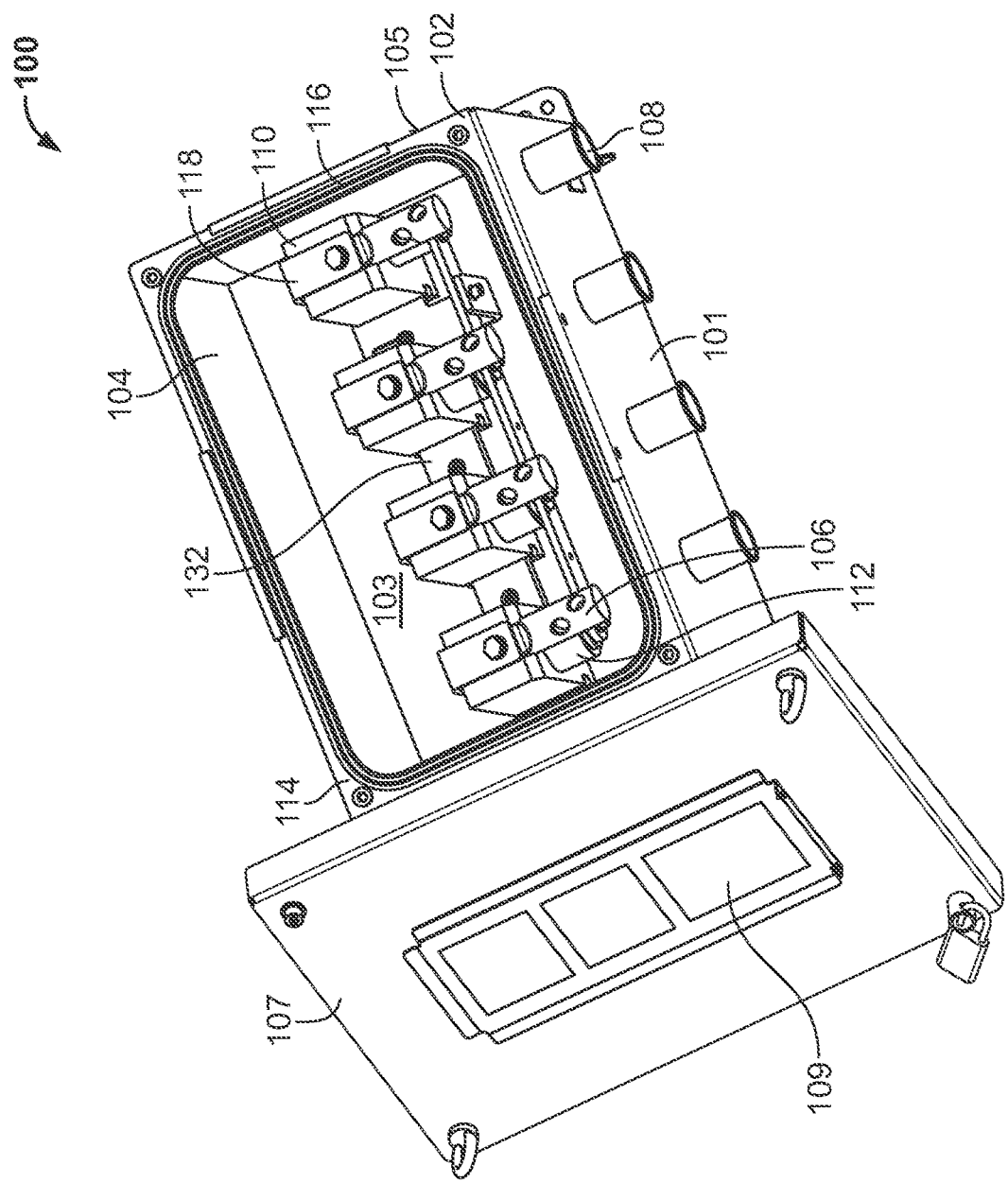
FIG. 1 is a perspective view of an opened sheath-bonding link box according to a first configuration.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

FIG. 1 shows a perspective representation of a sheath-bonding link box 100 with an opened lid 107. The link box 100 has a housing 102 which forms an enclosure for an interior space 104 for arranging therein internal connecting portions 106 of electrically conductive connectors. The external parts of the electrically conductive connectors are not shown in the Figures. Each internal connecting portion 106 is connectable to a screen connector (not shown in the Figure), which is fed through the feedthroughs 108 provided at the housing 102. The housing 102 has an essentially box-shaped body 101 with a base 103 and side walls 105 extending from the base 103, and a lid 107 which can be attached to the body releasably. The lid 107 may at least partly be transparent. For instance, a transparent window 109 may be provided at the lid 107 for allowing visual inspection of the interior space 104 and some or all the components arranged therein.

Figure 2:
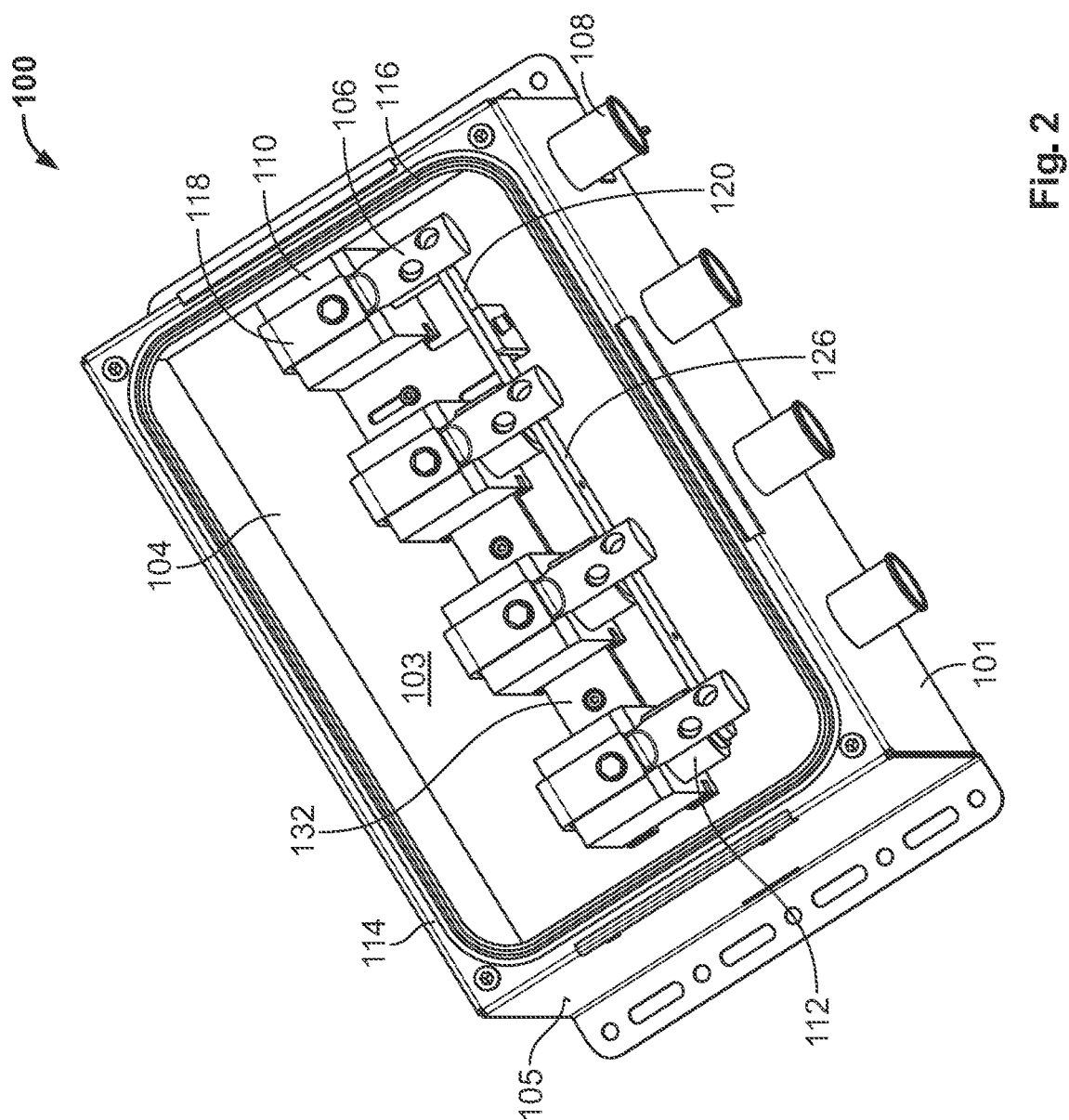
FIG. 2 is a further perspective view of the opened sheath-bonding link box according to the first configuration.
Figure 6:
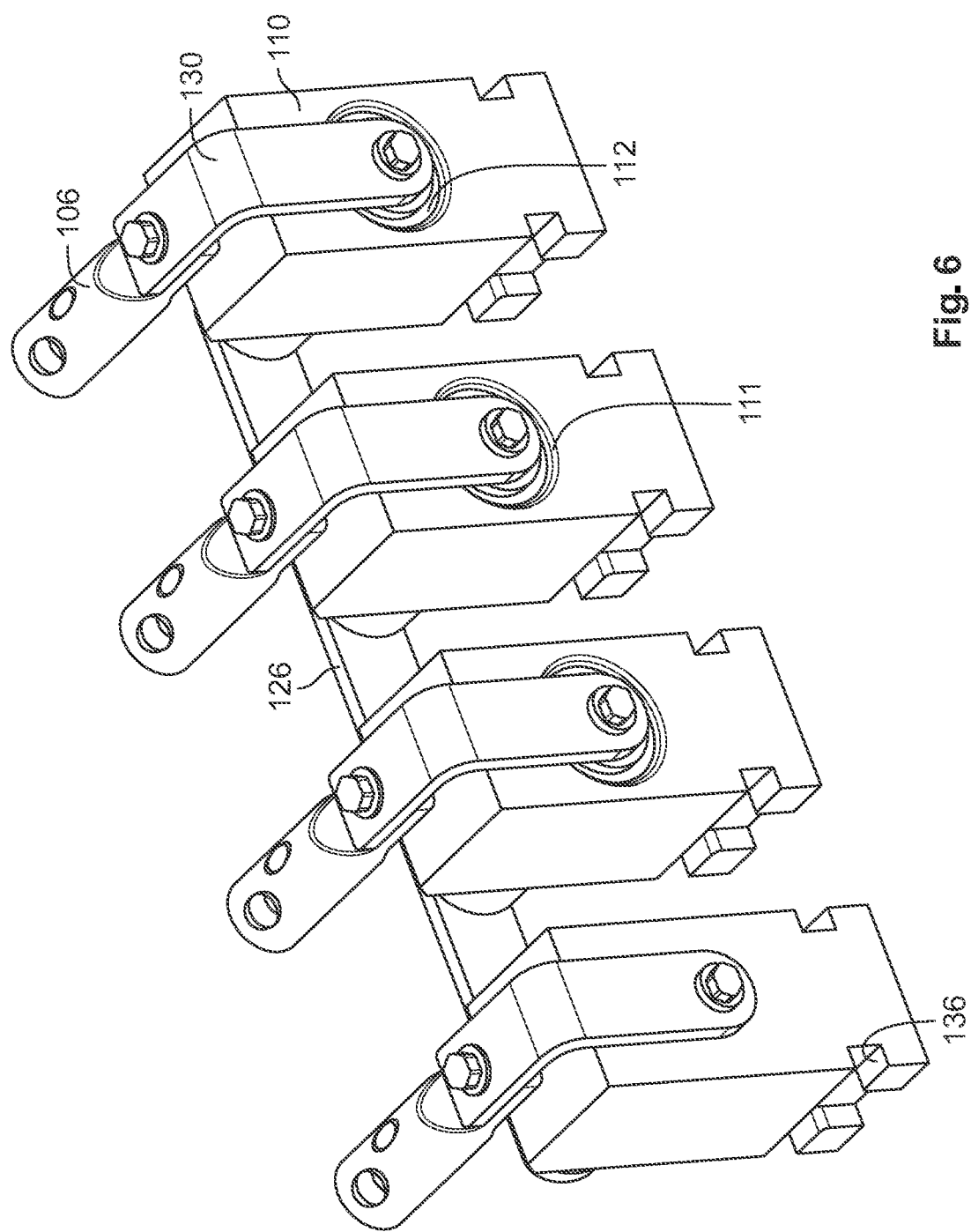
FIG. 6 is a further perspective view of a part of the link box according to the first configuration.

As will become more apparent from FIGS. 2 and 6, each internal connecting portion 106 is mounted on a carrier element 110. According to the present disclosure, the carrier elements 110 together form a carrier unit, are electrically insulating and have receptacles for at least partly receiving surge voltage limiters (SVLs) 112. The SVLs 112 form part of the functional links that interconnect the internal connecting portions 106.

In addition to the active functional links formed by the SVLs 112, passive functional links 118 are provided in the form of various interconnecting metal bars and/or bolts. The carrier elements 110 may be formed from any sufficiently robust electrically insulating material, such as ceramic or plastic material. Of course, instead of a plurality of individual carrier elements 110, the carrier unit may also be formed as an integral part supporting the electrically conductive parts.

In order to electrically screen the interior space 104, the housing 102 is at least partly covered with a metal screen 114. Furthermore, the interface between the housing body 101 and the lid 107 is sealed by means of a gasket 116, for instance made from an elastic material such as silicone.

Figure 40:
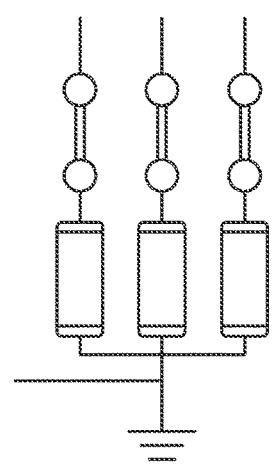

The electrical configuration of the example shown in FIGS. 1 to 7 corresponds to the circuit diagram shown in FIG. 40, namely a direct connection with SVLs.

Figure 3:
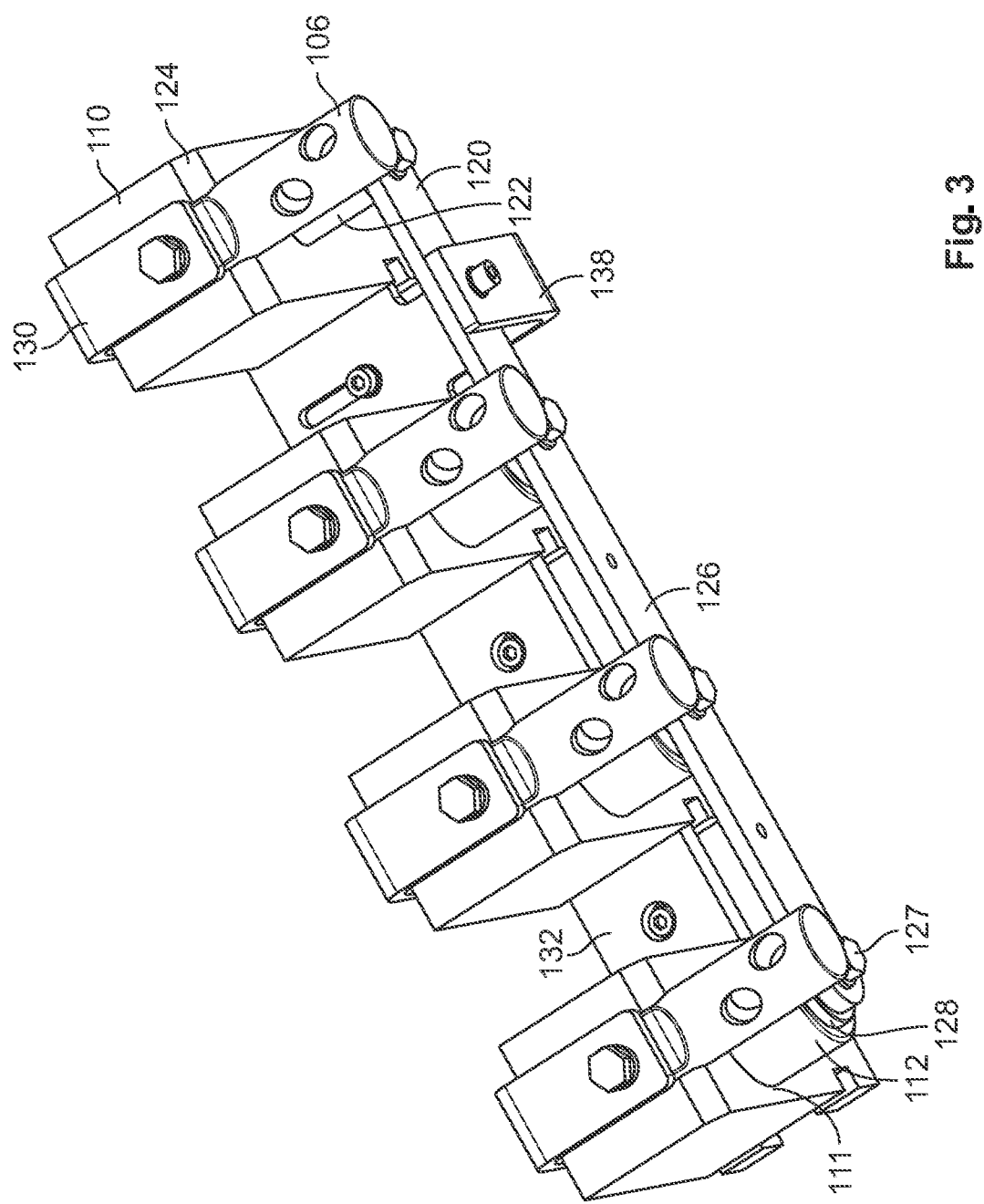
FIG. 3 is a perspective view of a part of the link box according to the first configuration.

Now referring to FIGS. 2 and 3, the carrier elements 110 and the internal connecting portions 106 are shown with the functional links 120, but without the housing 102. Each of the internal connecting portions 106 of one electrically conductive connector is mounted on top of one carrier element 110. Further, each carrier element 110 has a receptacle 111 for an SVL or a passive functional link formed by an electrically conductive bolt 122. In the shown example, the receptacles 111 are formed by bores leading through the carrier elements 110 and the size of the bores is different for the SVLs 112 or the bolts 122. Of course, the receptacles may also have an identical shape, when the bolts 122 are formed to have a larger diameter (for instance by adding a further insulating layer).

Each of the carrier elements 110 is essentially block-shaped, i.e., formed as a parallelepiped, and has a bevel 124 for accommodating the internal connecting portions 106. Of course, any other suitable shape may also be used for the carrier elements 110. According to the present disclosure, the internal connecting portions 106 and the receptacles 111 are arranged with their longitudinal axes extending along each other, so that the SVLs 112 and the bolt 122 are located below the plane defined by the internal connecting portions 106. Thus, the position of the internal connecting portions 106 is not influenced by the length of the SVLs 112, and consequently also the footprint of the housing is not impacted by the particular type of SVL 112.

For electrically connecting the three SVLs 112 of the aspect shown in FIGS. 1 to 7, a cross bar 126 (for instance made from metal) is screwed to the respective grounded ends 128 of the SVLs 112. This cross bar 126 also forms a part of the set of functional links interconnecting the internal connecting portions 106. Optionally, an angled grounding connector 138 may be provided for connecting the cross bar 126 to the base 103 of the housing 102. Thereby, the housing 102 can be connected to ground potential.

Furthermore, for connecting the internal connecting portions 106 to the second ends 129 of the SVLs 112, angled bars 130 are attached to the internal connecting portions 106 and the second ends 129 of the SVLs 112. The angled bars 130 with their longer portion extend along the longer side of the carrier elements 110 and across to the longitudinal axes of the SVLs 112 and of the internal connecting portions 106. The angled bars 130 may be attached by a screw connection 127. However, any other suitable electrical connection, such as riveting or soldering, may also be used.

Figure 4:
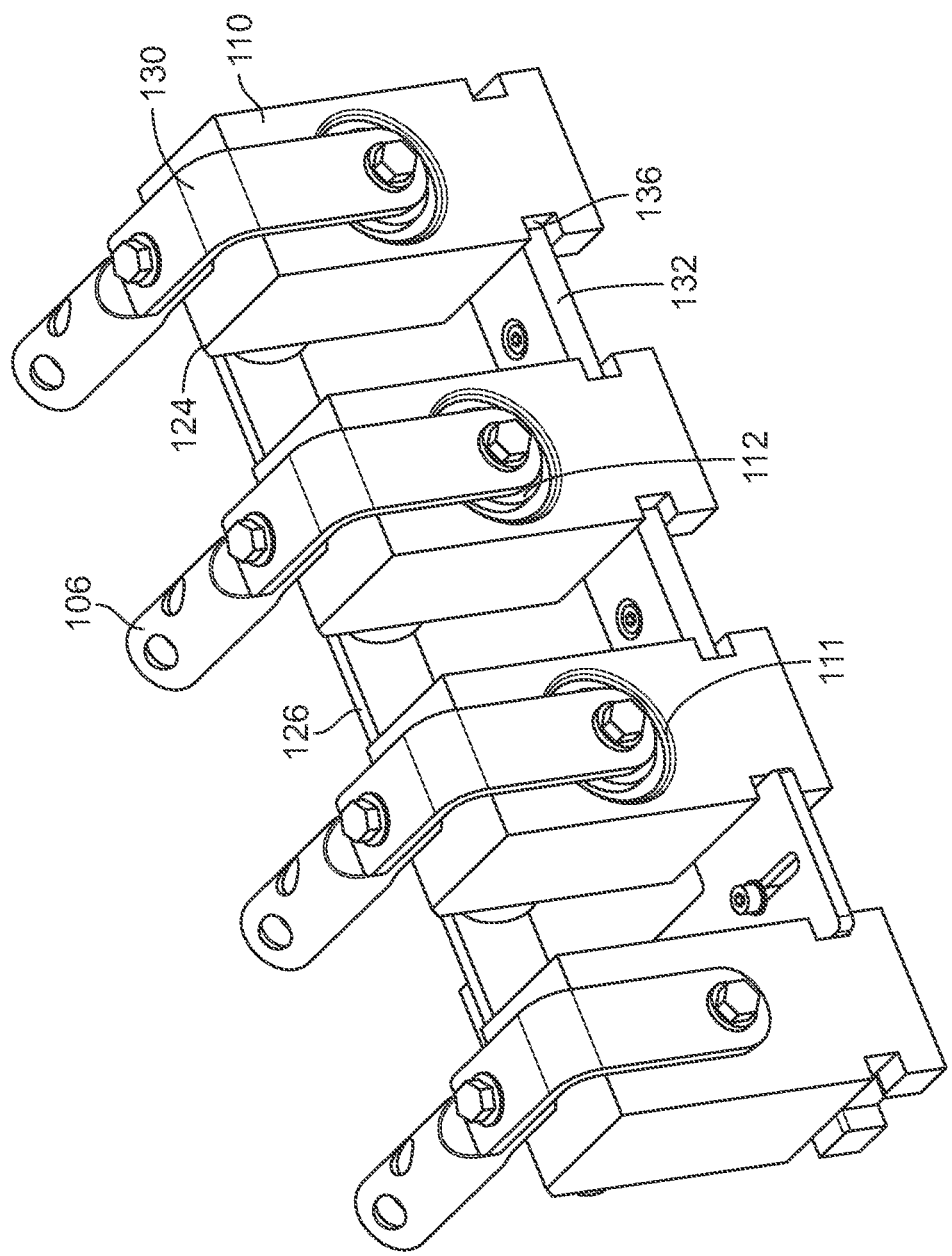
FIG. 4 is a perspective view of the configuration of FIG. 3 rotated by 180°.

For fixing the carrier elements 110 to a base of the housing body, each of the carrier elements 110 may comprise fixing means, such as a fixing plate 132. This fixing plate 132 may be a part separate from the carrier element 110 (for instance a metal or plastic plate) or may be fabricated as an integral part of the carrier element 110. For example, as shown in FIG. 4, the fixing plates 132 may be received in corresponding grooves 136 arranged in a region of the carrier elements 110 close to the base 103 of housing 102.

For fixing the fixing plates 132 to the base 103 of the housing 102, for instance a screw connection can be used as shown in the figures. However, any other suitable connection technique may also be employed. In the example explained with reference to FIGS. 1 to 7, the angled bars 130 are arranged on top of the internal connecting portions 106, so that each of the internal connecting portions 106 is sandwiched between one of the angled bars 130 and the top surface of one of the carrier elements 110.

Figure 5:
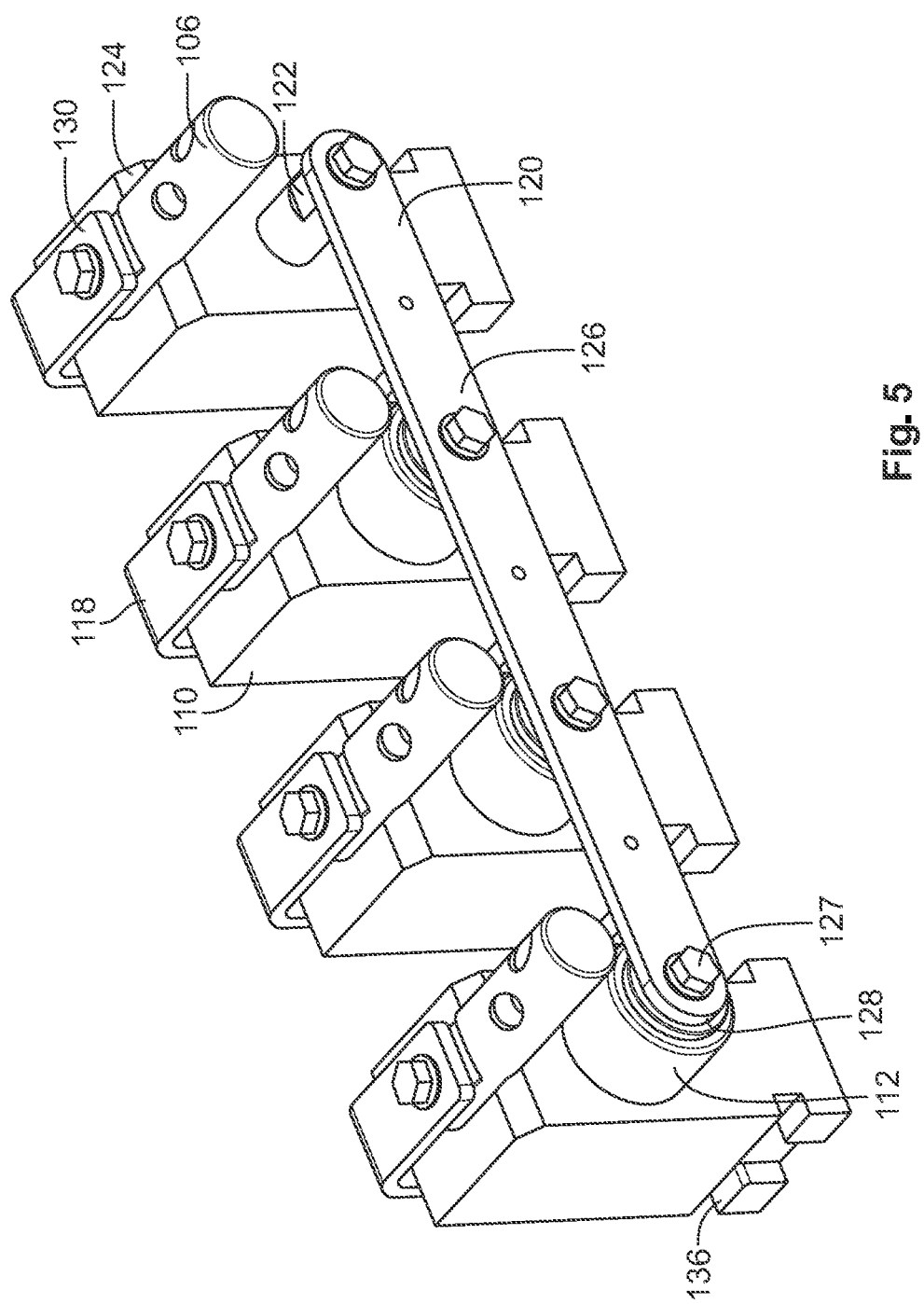
FIG. 5 is a further perspective view of a part of the link box according to the first configuration.

FIGS. 5 and 6 illustrate the carrier elements 110 with the SVLs 112 and the passive functional links 118, but without the fixing plates and the grounding connector to show more clearly the structure of the grooves 136 at the carrier elements 110. It should be noted that the grooves 136 are arranged on both lateral side walls of each carrier element 110, so that the same geometry of carrier element 110 can be used at each position in the sheath-bonding link box 100.

Figure 7:
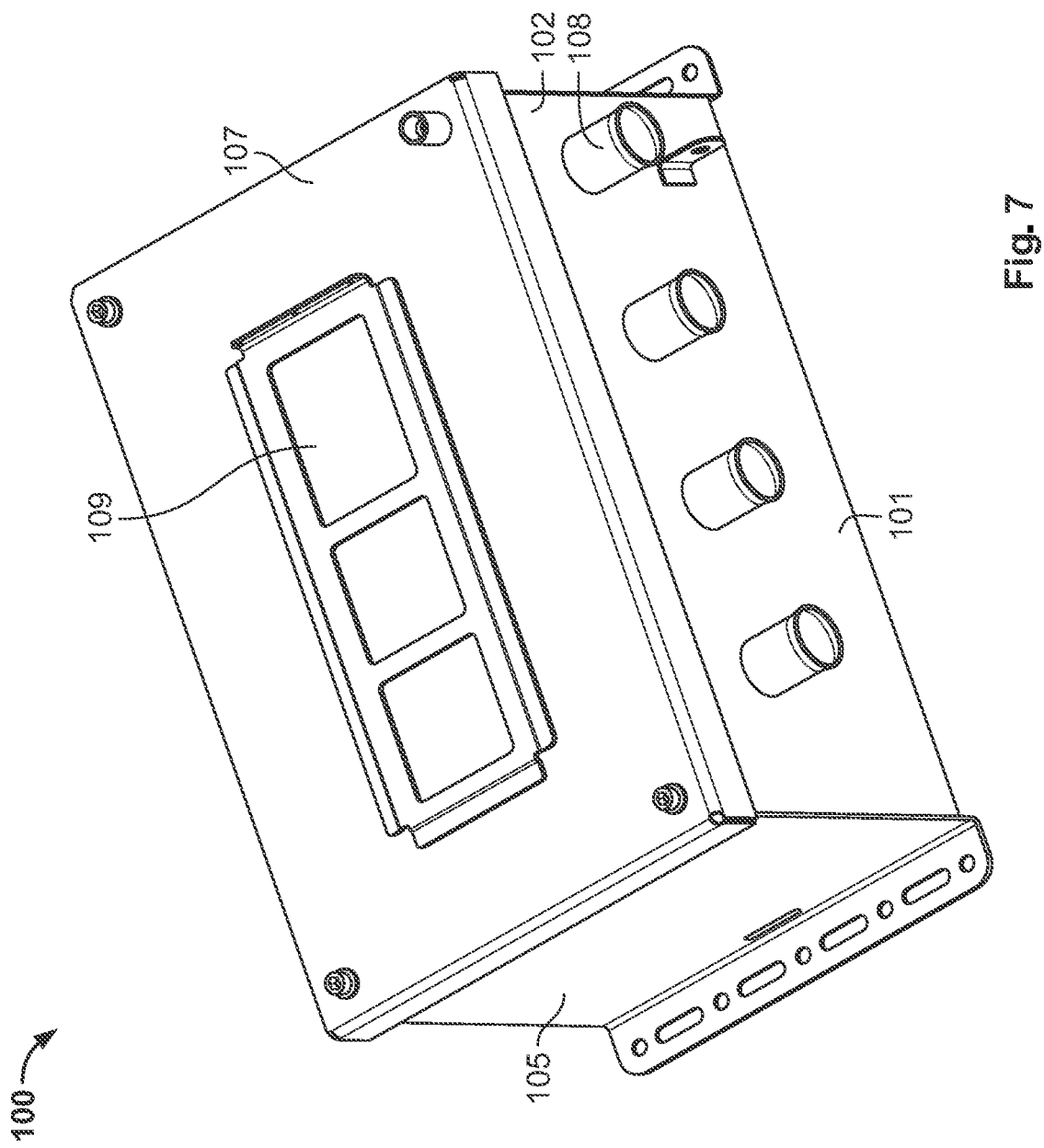
FIG. 7 is a perspective view of the closed sheath-bonding link box according to the first configuration.
Figure 8:
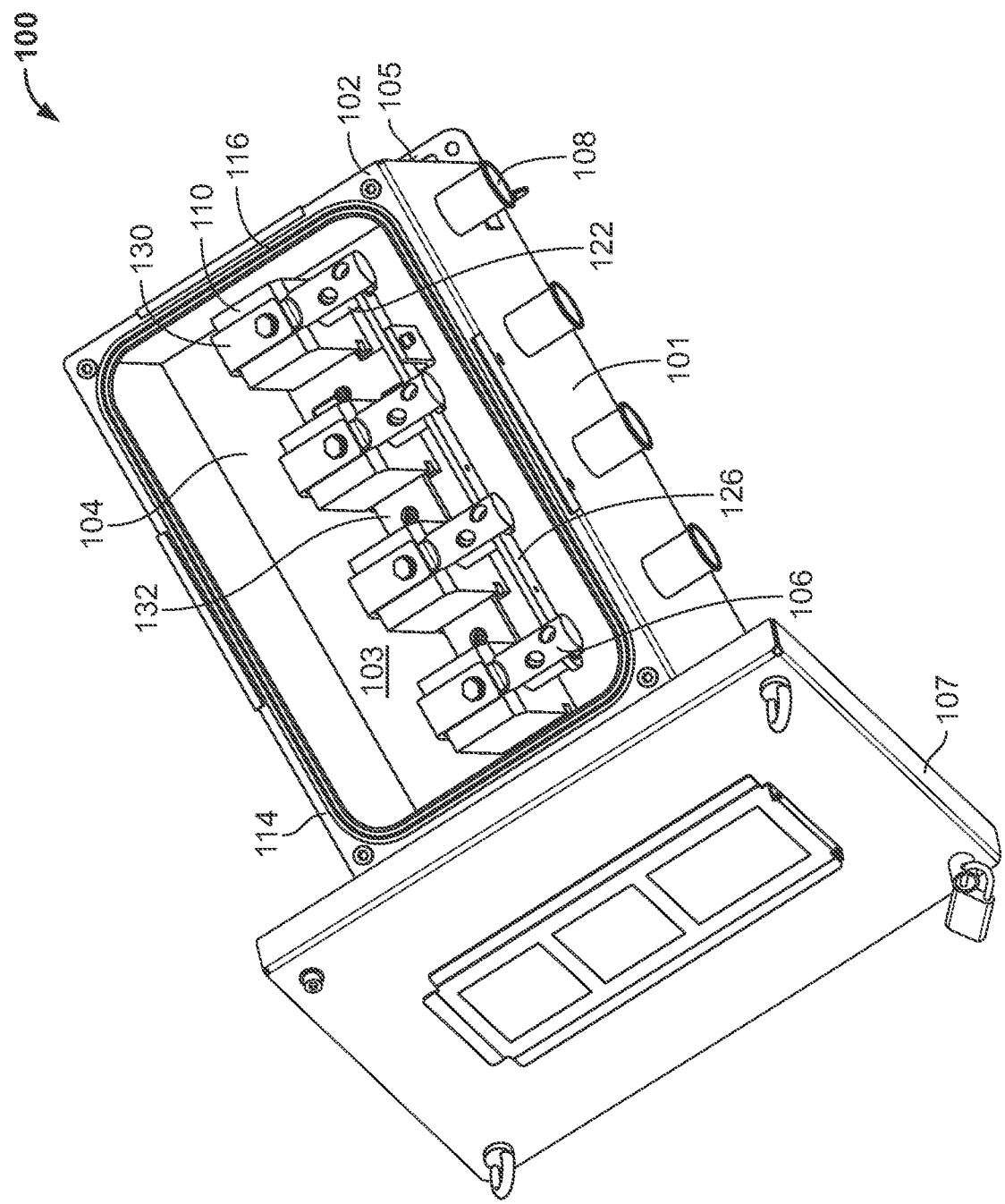
FIG. 8 is a perspective view of an opened sheath-bonding link box according to a second configuration.
Figure 9:
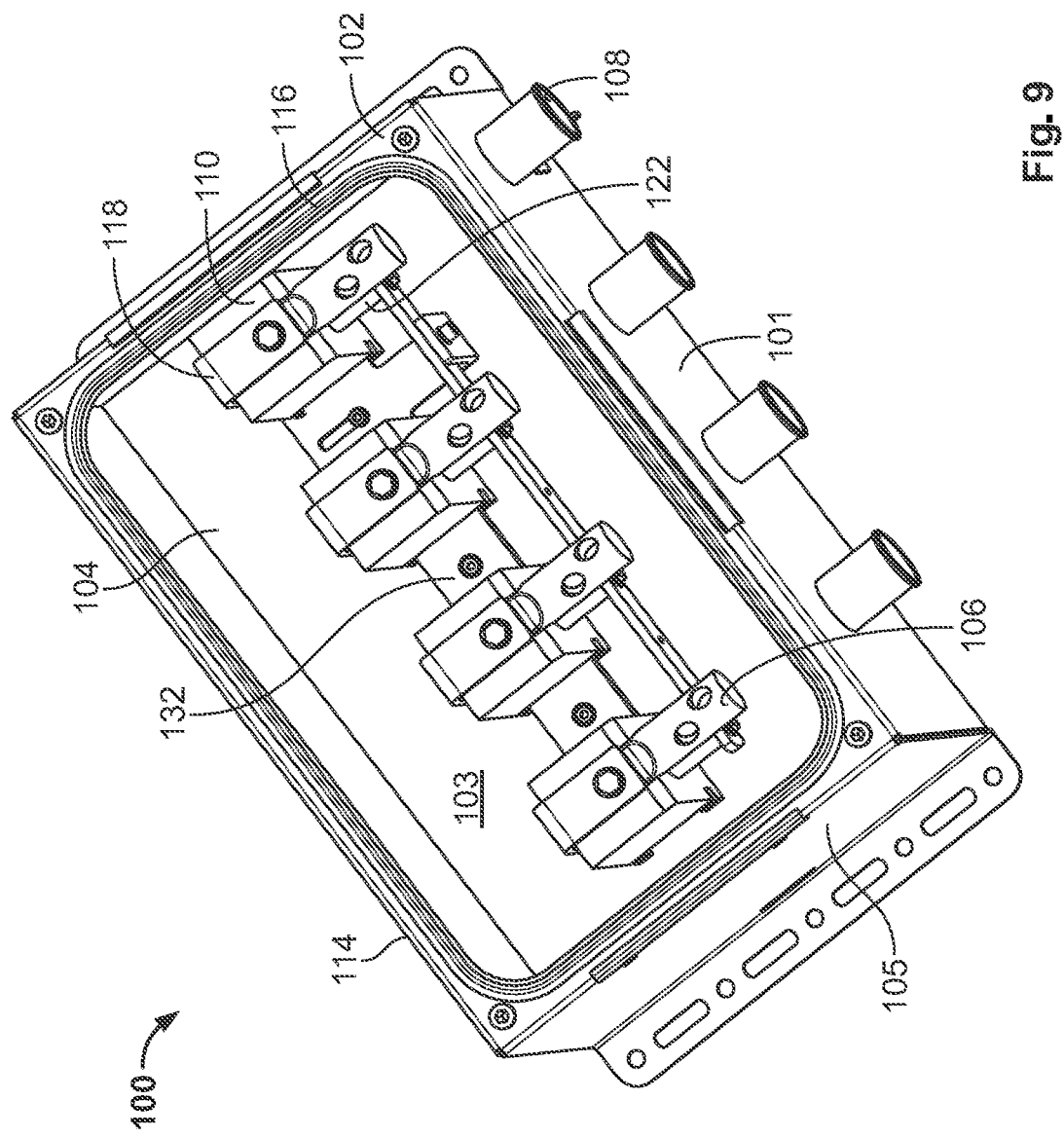
FIG. 9 is a further perspective view of the opened sheath-bonding link box according to the second configuration.
Figure 10:
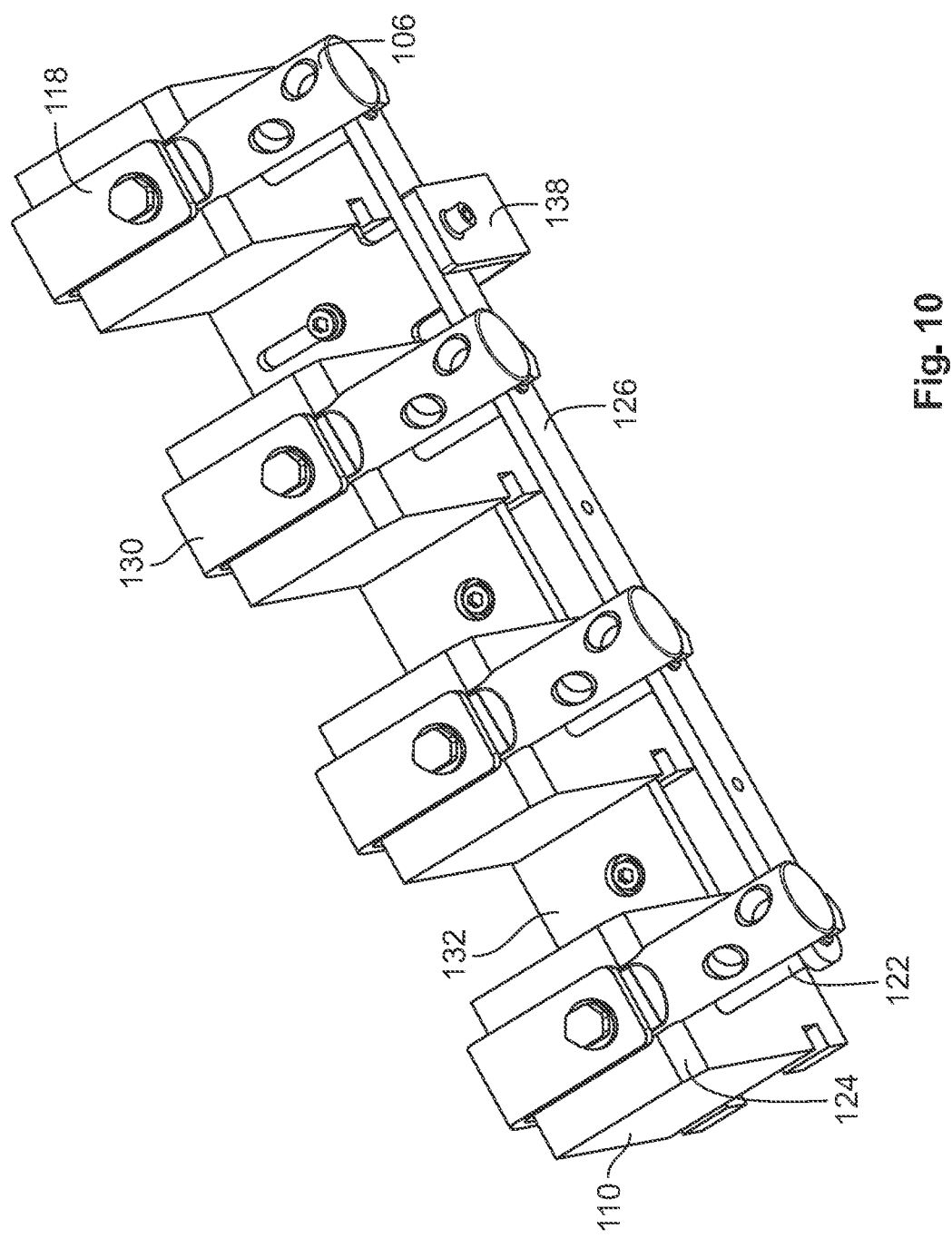
FIG. 10 is a perspective view of a part of the link box according to the second configuration.
Figure 11:
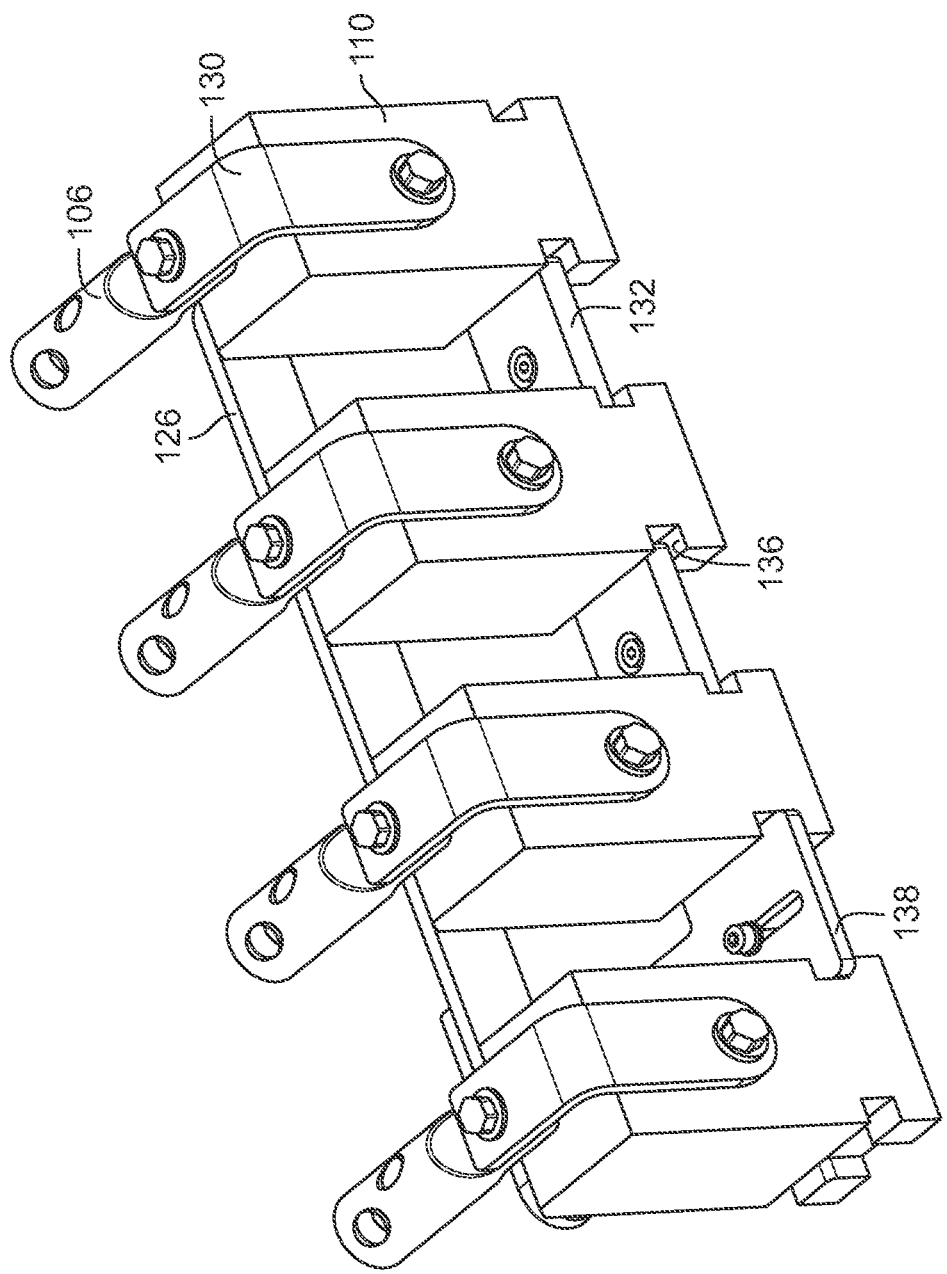
FIG. 11 is a perspective view of the configuration of FIG. 10 rotated by 180°.

FIG. 7 illustrates the sheath-bonding link box 100 in a state where the lid 107 is closed. Advantageously, the transparent window 109 still grants visual access to the interior of the housing 102. The transparent window 109 may also comprise a display for displaying output information from one or more sensors arranged inside the sheath-bonding link box 100.

Figure 39:
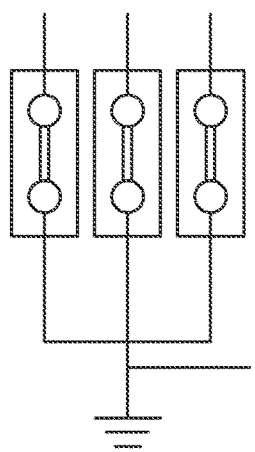
FIGS. 39-42 illustrate circuit diagrams of various sheath interconnection configurations.

Furthermore, for implementing the direct grounding topology illustrated in FIG. 39, the arrangement shown in FIGS. 8 to 14 can be used. Instead of any SVLs, the carrier elements 110 all have receptacles 111 for passive functional links formed by electrically conductive bolts 122. Apart from this modification, the other elements explained with reference to FIGS. 1 to 7 remain the same and will not be described. Again, the arrangement shown in FIGS. 8 to 14 can be realized using exactly the same carrier elements 110, angled bars 130, and cross bar 126 as used for the configuration of FIGS. 1 to 7.

Figure 12:
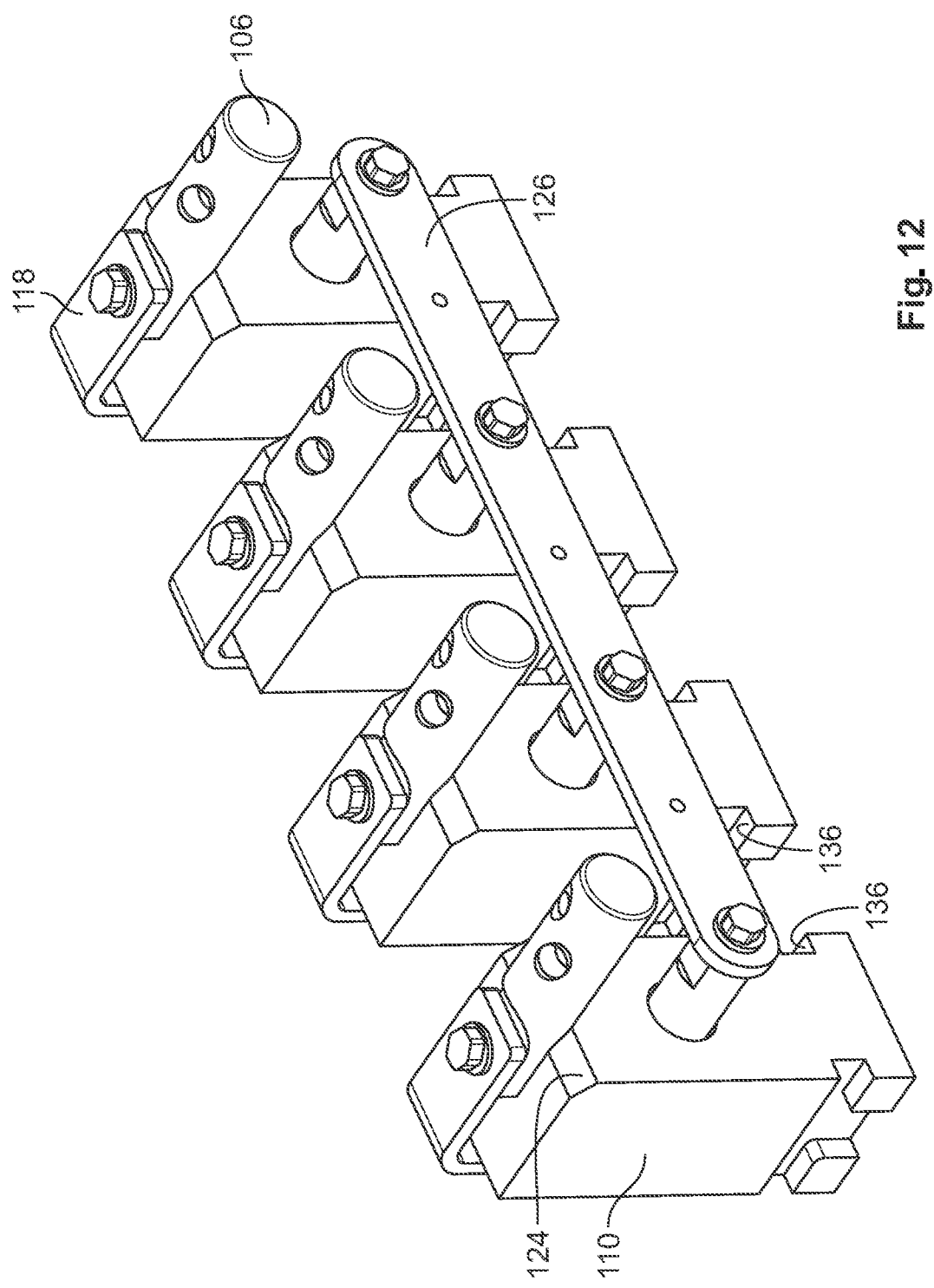
FIG. 12 is a further perspective view of a part of the link box according to the second configuration.
Figure 13:
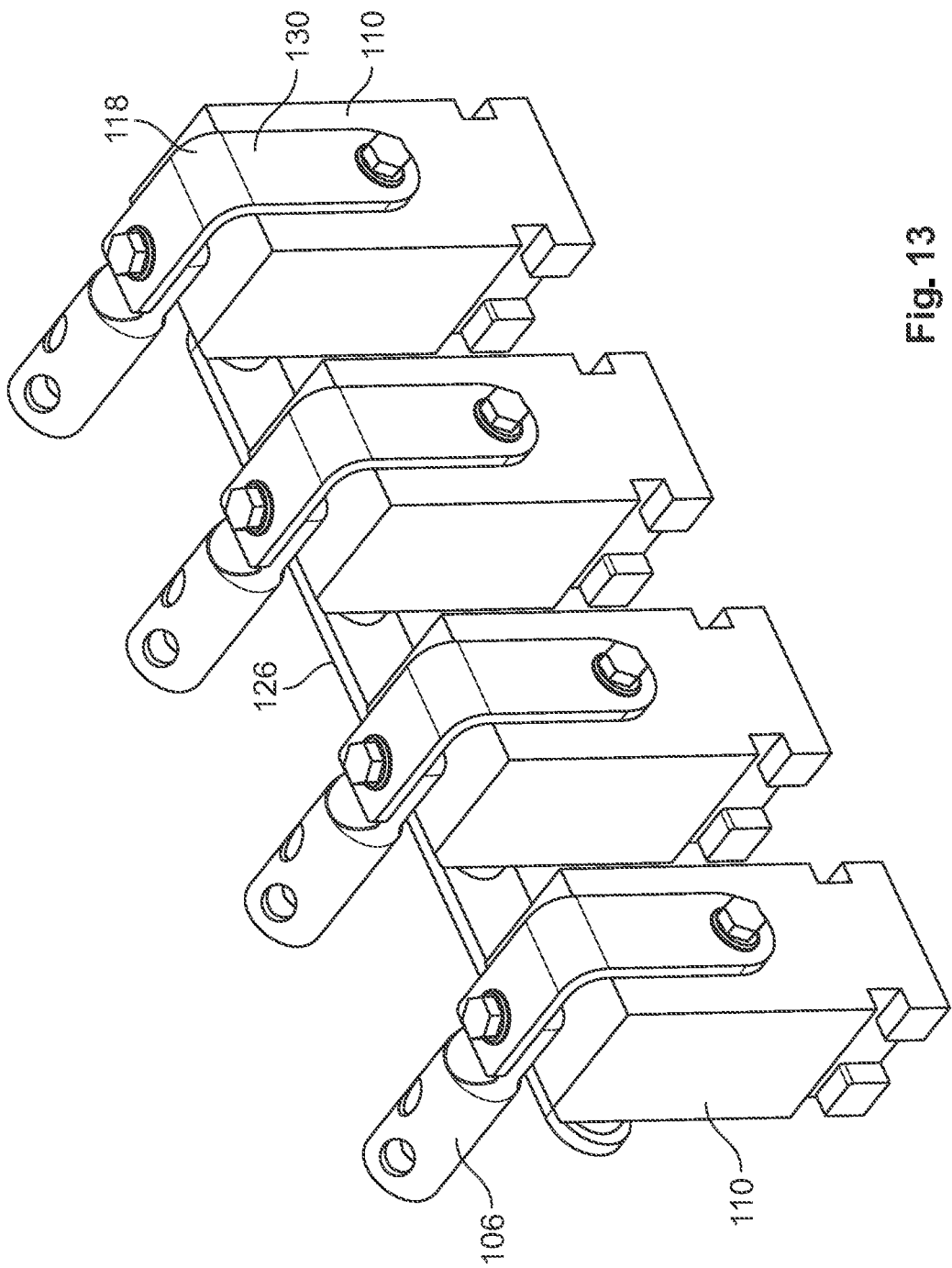
FIG. 13 is a further perspective view of a part of the link box according to the second configuration.

FIGS. 12 and 13 illustrate the carrier elements 110 with the SVLs 112 and the passive functional links 118, but without the fixing plates and the grounding connector to show more clearly the structure of the grooves 136 at the carrier elements 110. It should be noted that the grooves 136 are arranged on both lateral side walls of each carrier element 110, so that the same geometry of carrier element 110 can be used at each position in the sheath-bonding link box 100.

Figure 14:
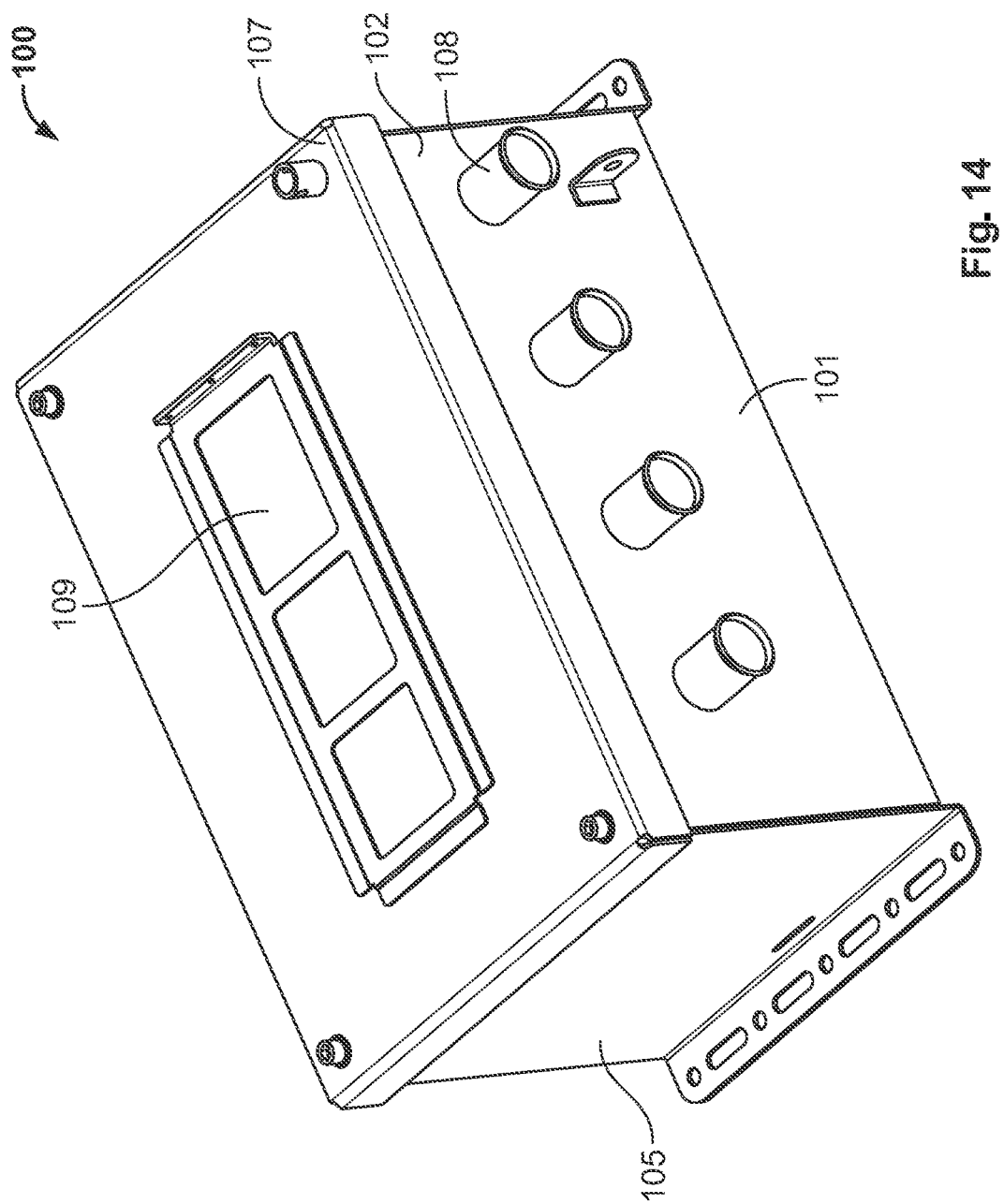
FIG. 14 is a perspective view of the closed sheath-bonding link box according to the second configuration.

FIG. 14 illustrates the sheath-bonding link box 100 in a state where the lid 107 is closed. Advantageously, the transparent window 109 still grants visual access to the interior of the housing 102. The transparent window 109 may also comprise a display for displaying output information from one or more sensors arranged inside the sheath-bonding link box 100.

Figure 15:
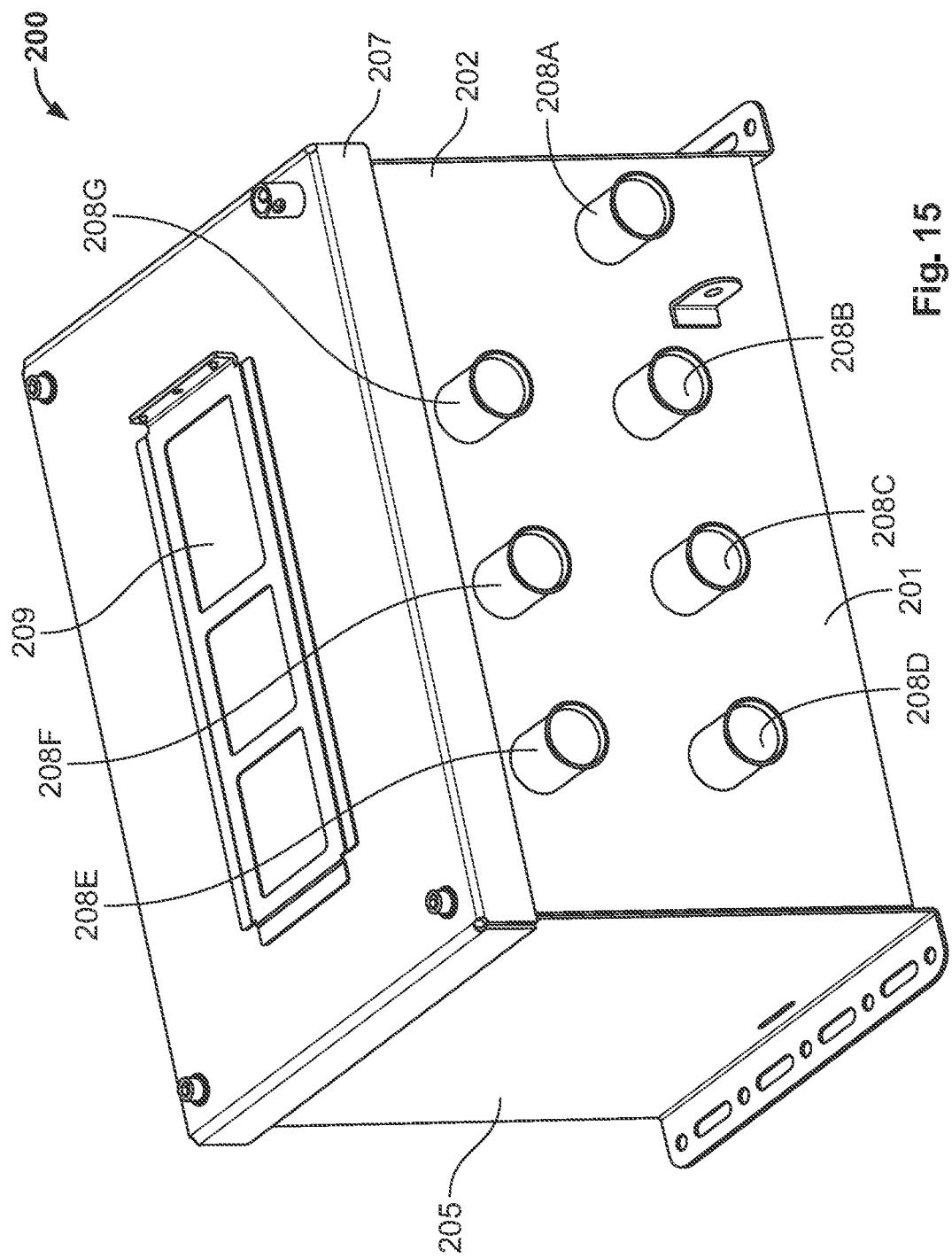
FIG. 15 is a perspective view of the closed sheath-bonding link box according to a third configuration.
Figure 16:
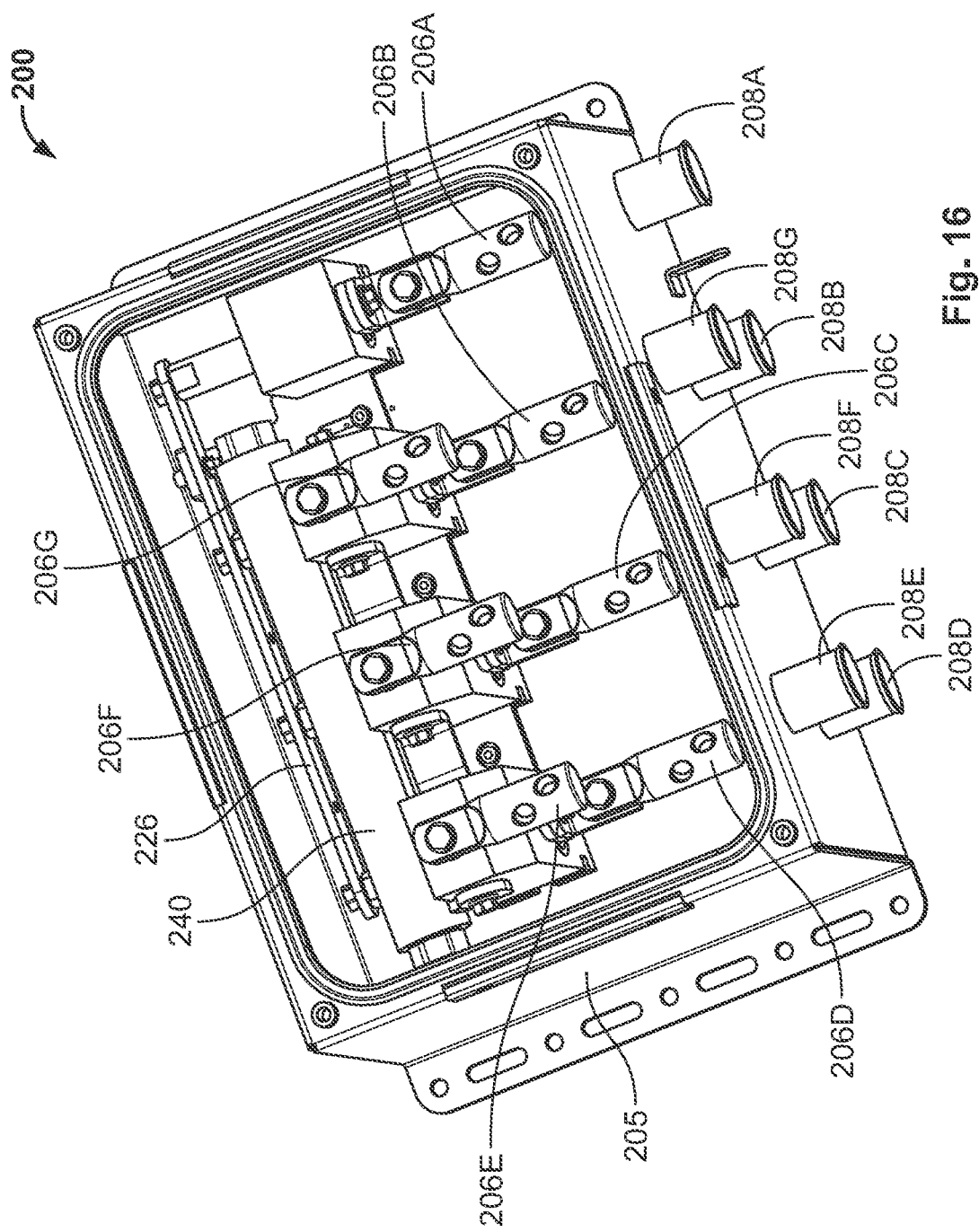
FIG. 16 is a perspective view of the opened link box according to the third configuration.
Figure 17:
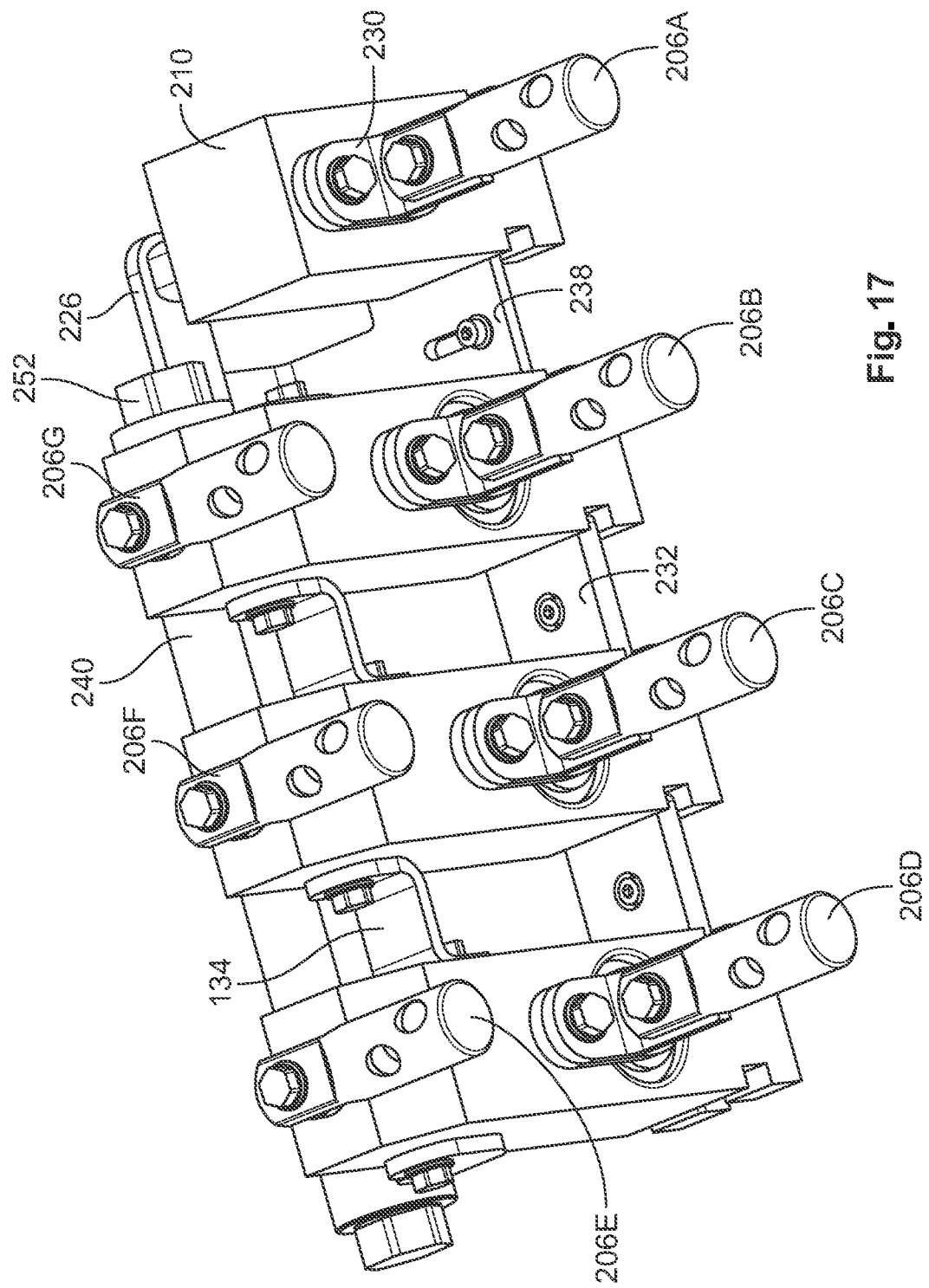
FIG. 17 is a perspective view of a part of the link box according to the third configuration.
Figure 18:
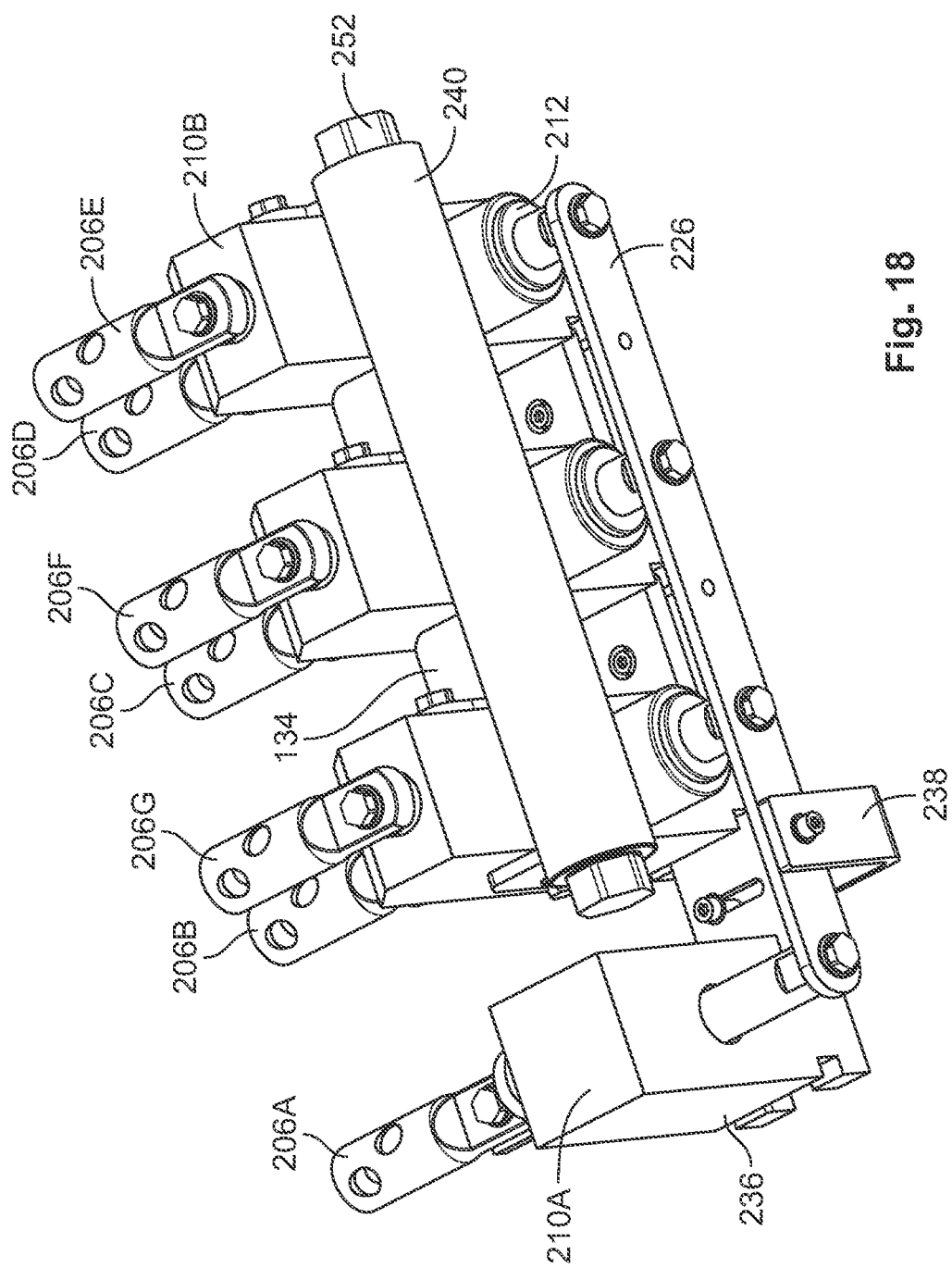
FIG. 18 is a perspective view of the configuration of FIG. 17 rotated by 180°.
Figure 19:
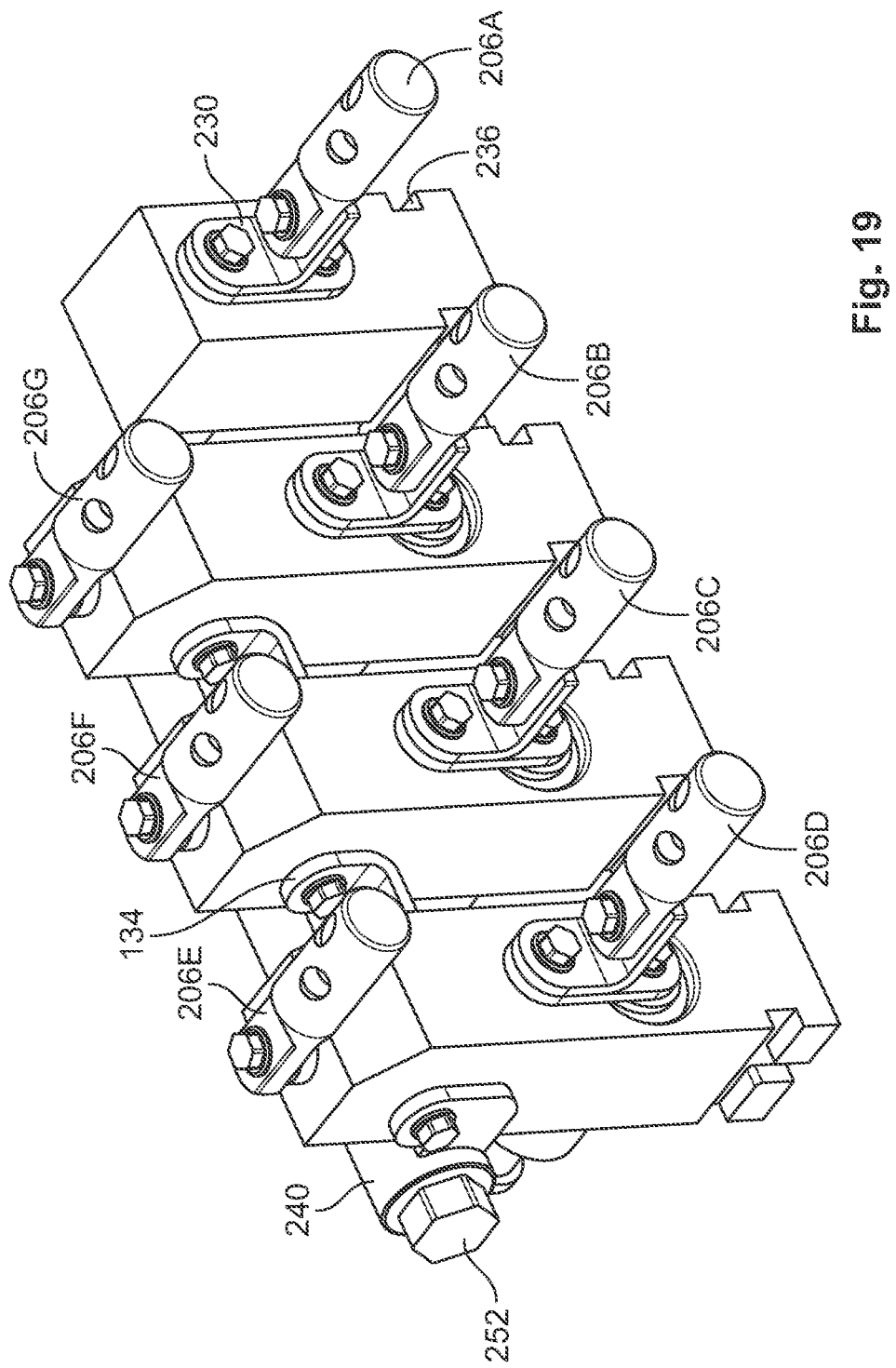
FIG. 19 is a further perspective view of a part of the link box according to the third configuration.
Figure 20:
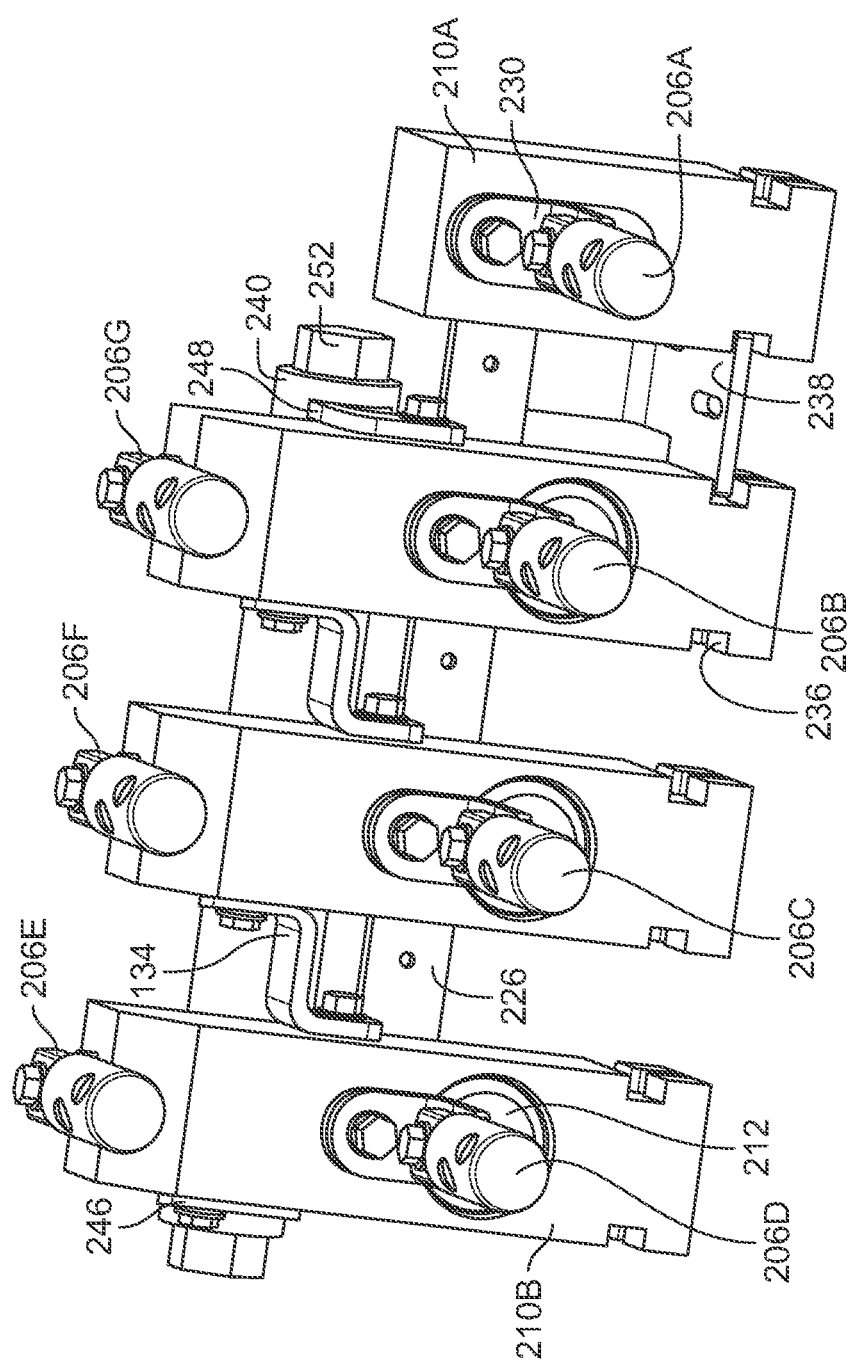
FIG. 20 is a further perspective view of a part of the link box according to the third configuration.
Figure 21:
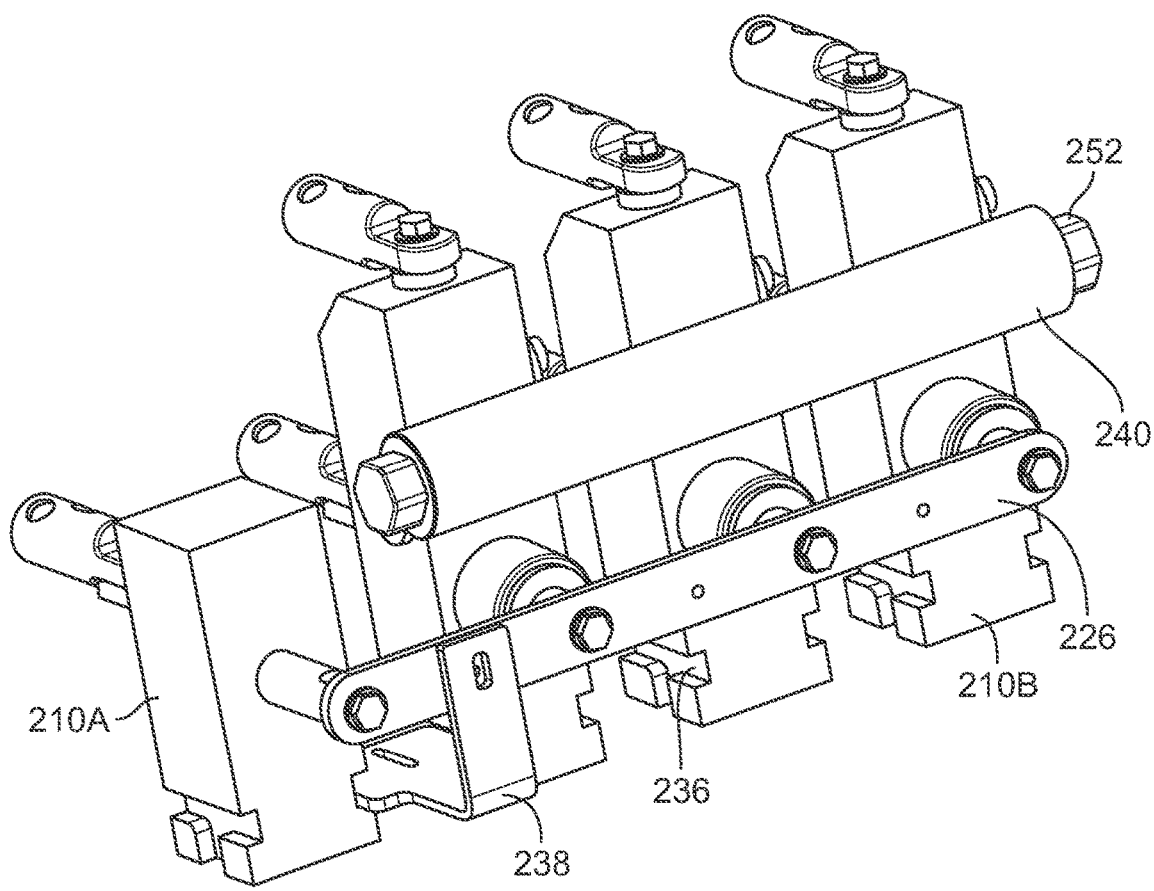
FIG. 21 is a further perspective view of a part of the link box according to the third configuration.
Figure 41:
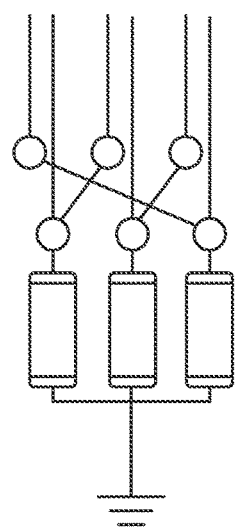
Figure 42:
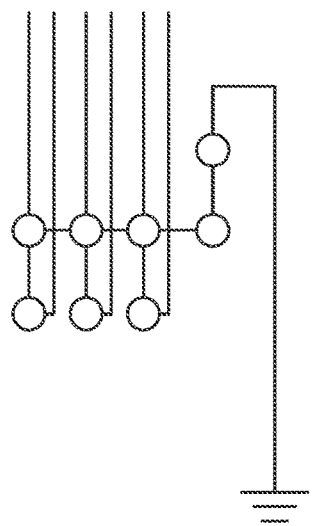
Figure 43:
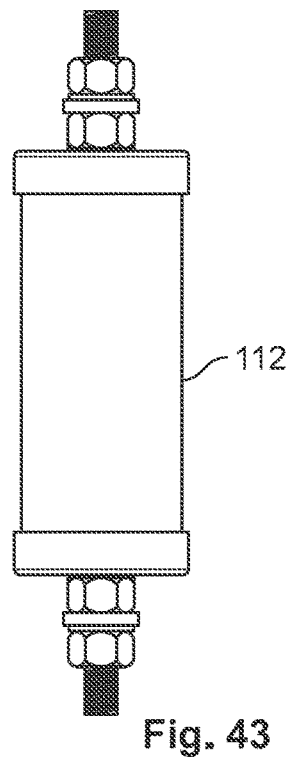
FIG. 43 illustrates a surge voltage limiter (SVL).

For a sheath-bonding link box 200 realizing the interconnection scheme depicted in FIG. 41, three further internal connecting portions 206 are provided and interconnected by additional cross bars and angled bars. This configuration will be explained in more detail with reference to FIGS. 15 to 33. According to the present disclosure, the additional group of internal connecting portions 106 is arranged in a plane above the other group of four internal connecting portions 106. By thus taking advantage of the third dimension in a direction away from the base of the housing body, a particularly compact and space saving topology can be achieved. Thus, as can be seen from FIG. 15, the sheath-bonding link box 200 comprises corresponding feedthroughs 208A-208G.

For electrically connecting the first, lower group of internal connecting portions 106A-106D to the second, upper group of internal connecting portions 106E-106G further multiple angled electrically conductive bars 234 are provided. The angled bars 230, the multiple angled bars 234, and the cross bar 226 are for instance screwed together and to the internal connecting portions 206A-206G. Other suitable electrically conductive connections, such as riveting or soldering, can also be used. Furthermore, in addition to the first cross bar 226 a second cross bar 240 is provided, which is completely covered with electrically insulating material 250. The electrically insulating material 250 ensures that no flash-over voltage can occur during operation. Any suitable material known in the art can be used as electrically insulating material 250, for instance an electrically insulating plastic or ceramic material or a combination of various materials.

According to the present disclosure, the carrier elements 210 of the sheath-bonding link box 200 provide additional second receptacles 142 for mounting therein electrically conductive interconnecting bolts 244. The interconnecting bolts 244 may comprise internal threads so that they can be connected to flat bars on the outside of the carrier elements by means of screws 227. Screws 227 which pass through one interconnecting bolt 244 and engages with another interconnecting bolt running across to the first interconnecting bolt allows for angled interconnections arranged inside the carrier elements 210.

This allows for a more complex, in particular crossing, electrical interconnection between the internal connecting portions 208 of electrically conductive connectors, at the same time ensuring mechanical robustness and avoiding flash-over voltages. Moreover, prefabricated metal parts with only a small number of different forms (elongated rods with internal and/or external threads 240, 244, once angled flat bars 230, twice angled flat bars 234, and a straight flat bar 226) have to be provided for assembling various wiring architectures.

Figure 22:
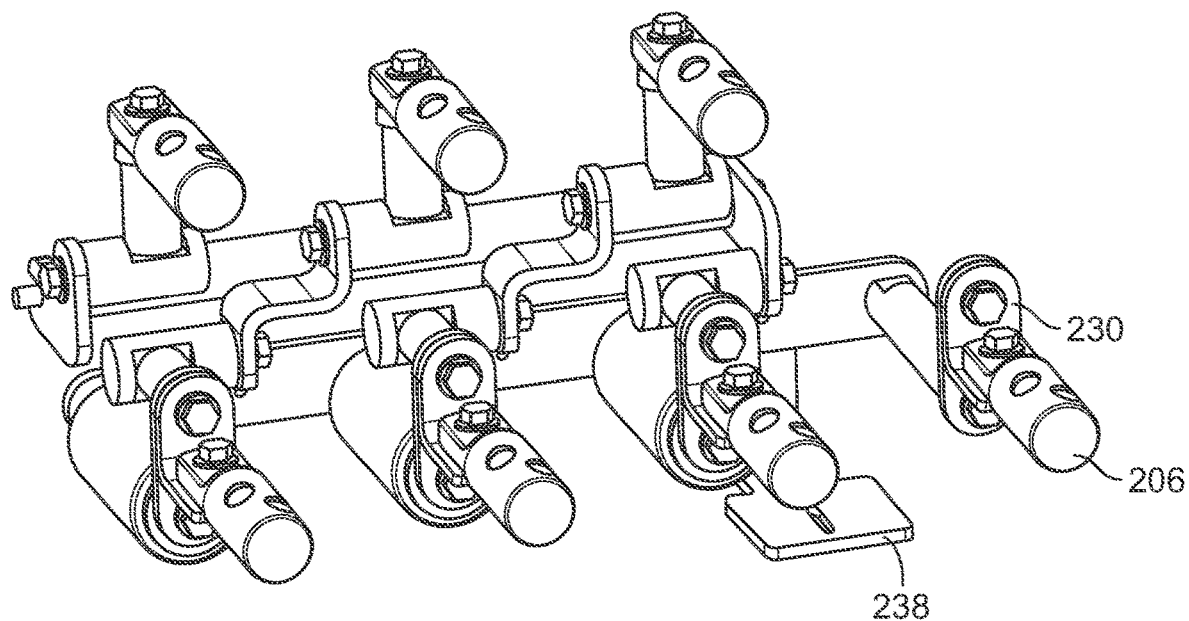
FIG. 22 is a perspective view of the electrically conducting parts of the link box according to the third configuration.
Figure 23:
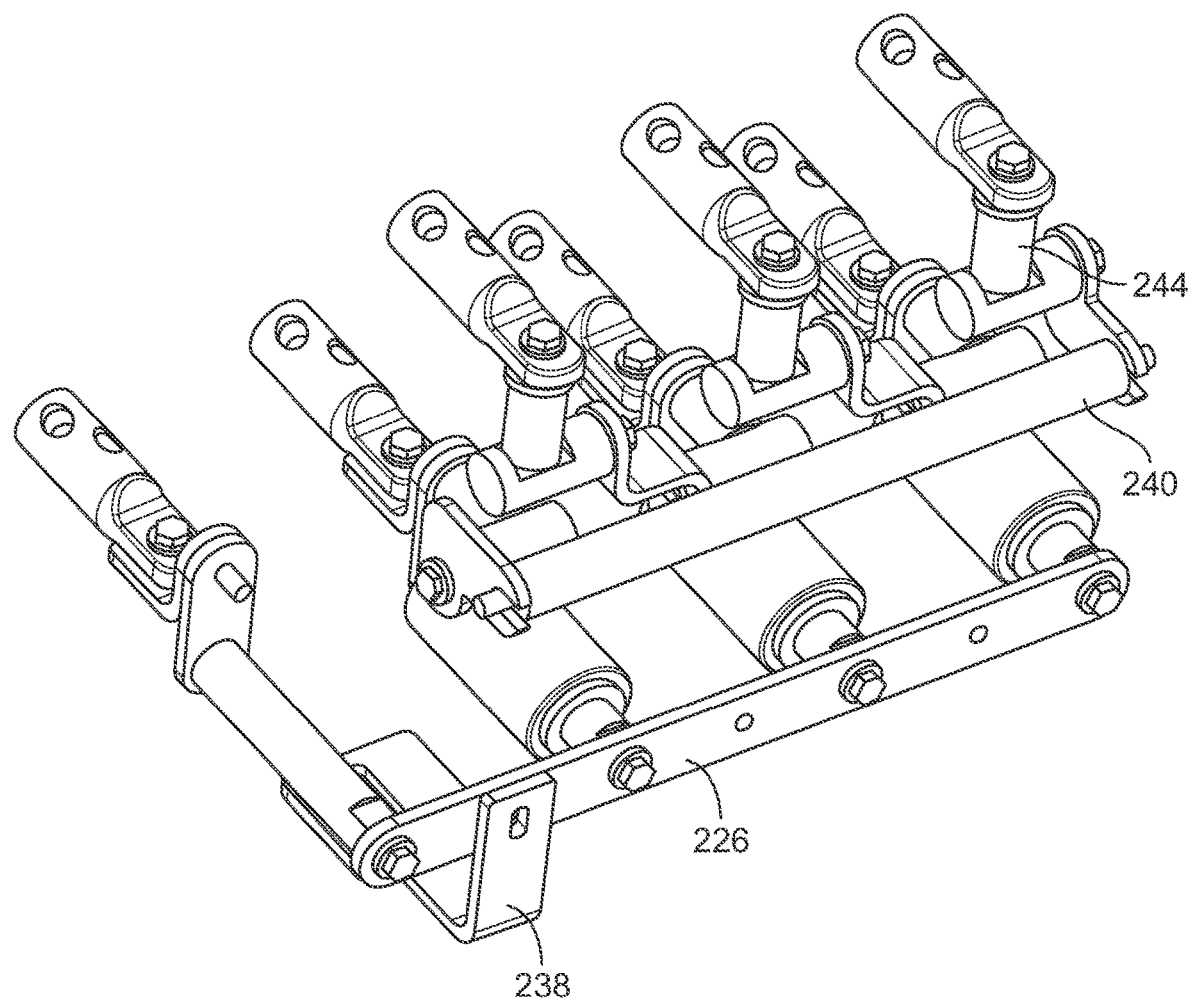
FIG. 23 is a perspective view of the configuration of FIG. 21 rotated by 180°.

FIGS. 22 and 23 show only the electrically conductive components, leaving out the insulating parts in order to illustrate the electrically conductive paths and the wiring between the seven internal connecting portions 206 of the electrically conductive connectors more clearly.

Figure 24:
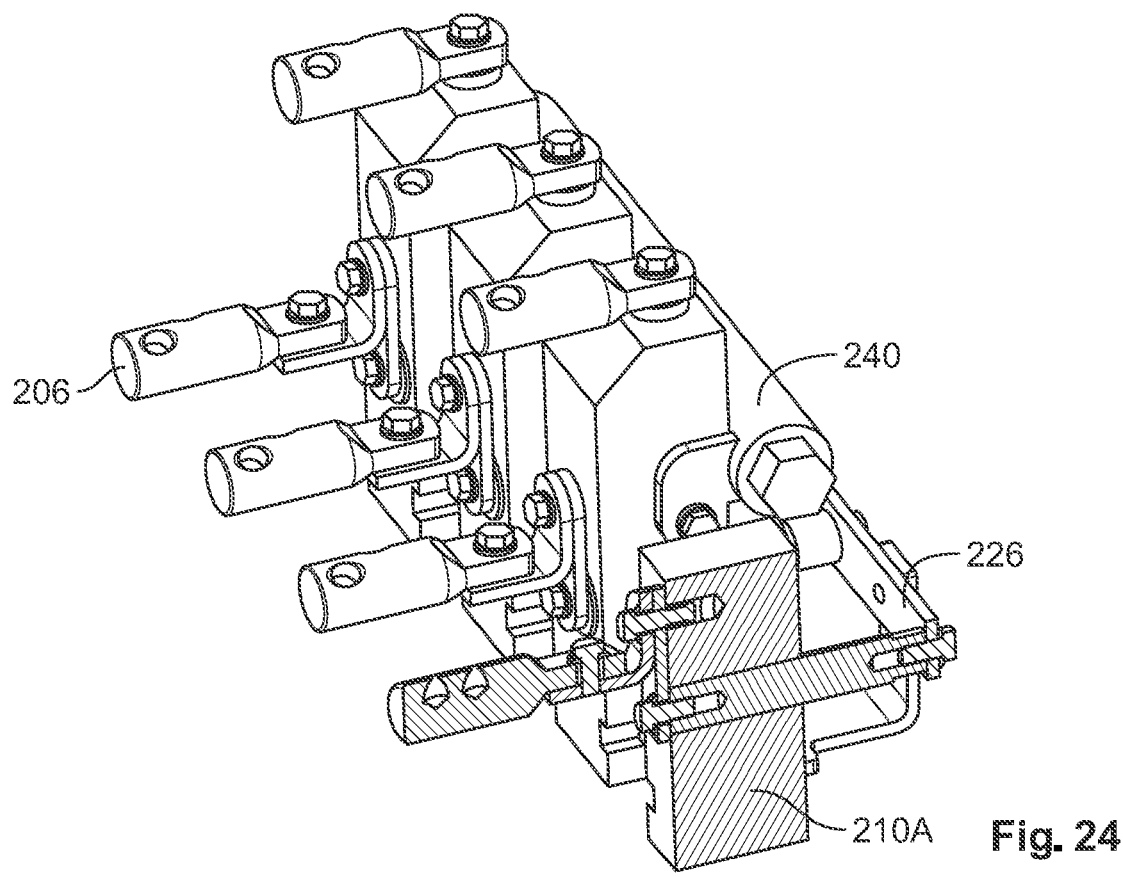
FIG. 24 is a partly sectional perspective view of a part of the link box according to the third configuration.
Figure 25:
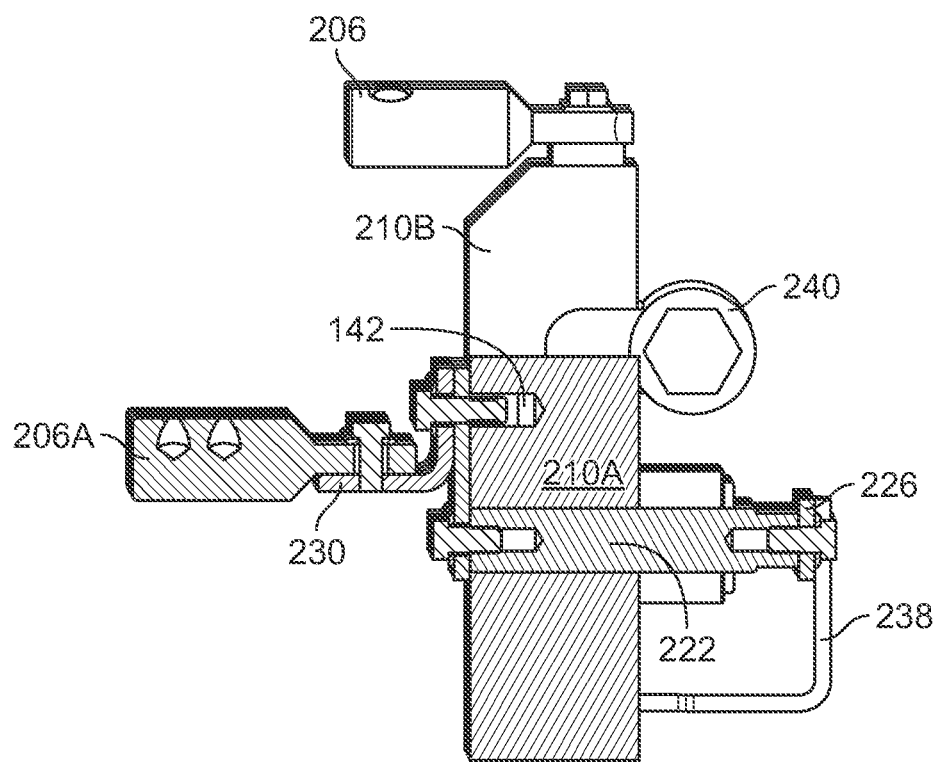
FIG. 25 shows a detail of FIG. 24.
Figure 26:
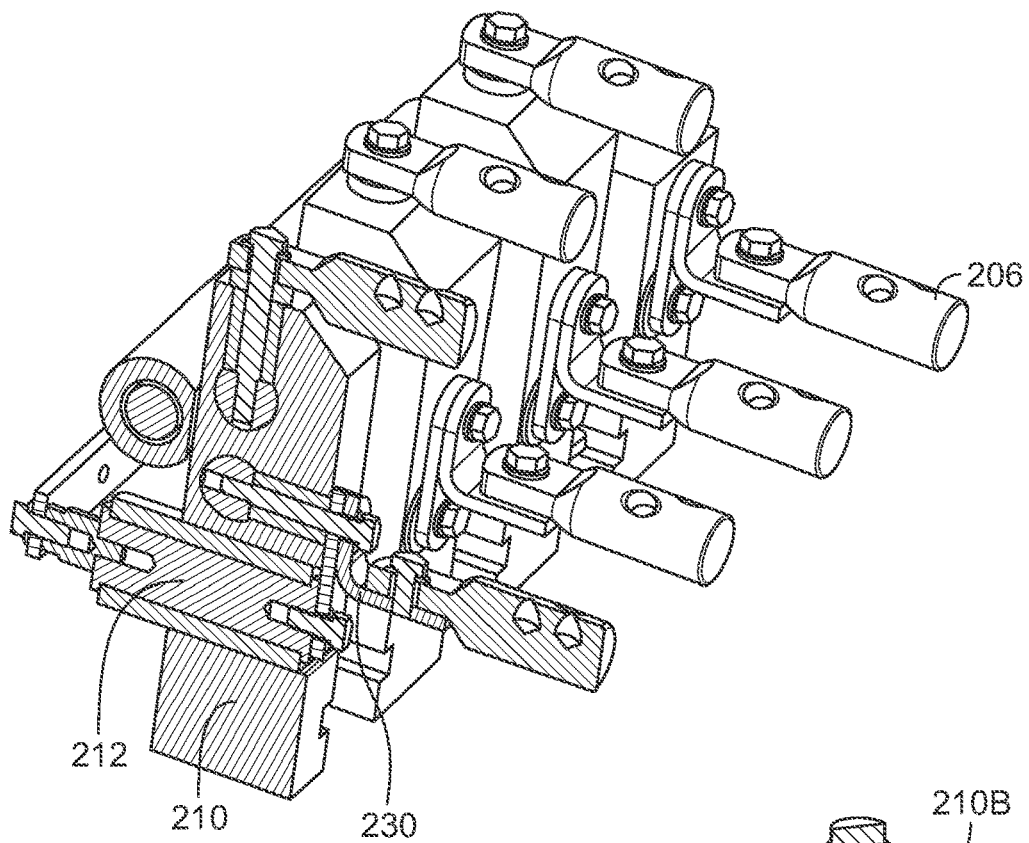
FIG. 26 is a further partly sectional perspective view of a part of the link box according to the third configuration.
Figure 27:
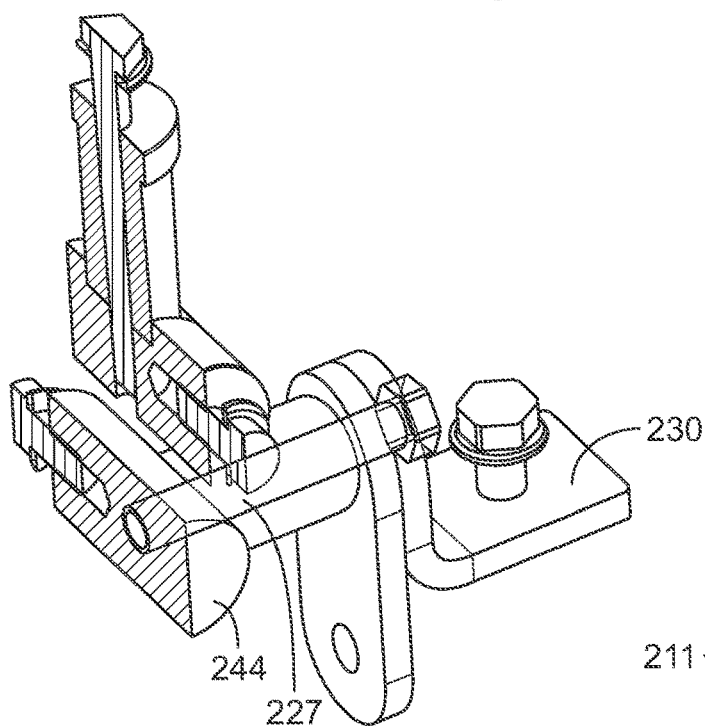
FIG. 27 is a further detail of the conductive parts of the link box according to the third configuration.
Figure 28:
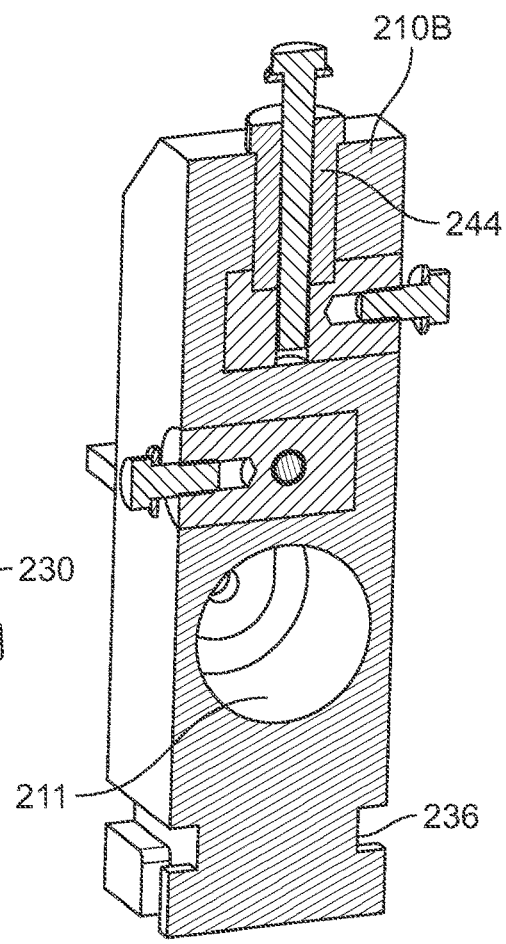
FIG. 28 is a sectional view of a carrier element without the surge voltage limiter (SVL)

Furthermore, the sheath-bonding link box 200 utilizes two different types of carrier elements 210. Firstly, a carrier element 210A referred to as a "rod tower" in the following is provided for interconnecting the first cross bar 226 via the electrically conductive bolt (a rod) 222 to the internal connecting portion 206A which will be connected to ground. Two sectional views of the rod tower 210A are shown in FIGS. 24 and 25. In distinction, as illustrated in FIGS. 26 to 28, a second type of carrier element 210B, referred to as "SVL tower" is provided for assembling the SVLs 212 together with the associated interconnecting bolts 244.

FIGS. 29 to 31 illustrate the fully encapsulated second cross bar 240 in more detail. As can be seen from the figures, the cross bar 240 is attached with a first connecting link 246 to the interconnecting bolt 244, which leads upwards to the internal connecting portion 208E. The cross bar 240 is connected with a second connecting link 248 to the interconnection bolt 244, which leads to the internal connecting portion 208B (see FIGS. 27 and 28 for the interior connection inside SVL tower 210B). Thus, an electrical cross connection can be established between the internal connecting portion 208E and the internal connecting portion 208B. Advantageously, this cross bar 240 is electrically insulated against voltage flash-over towards the grounded cross bar 226 by means of an insulating encapsulation material 250. In addition, the screw connection fixing the cross bar 240 at the second connecting link 248 is performed by using a threaded nut 252 with an insulating outer surface and an electrically conductive thread. The cross bar 240, on the other hand, is provided with a matching external thread 254.

Figure 32:
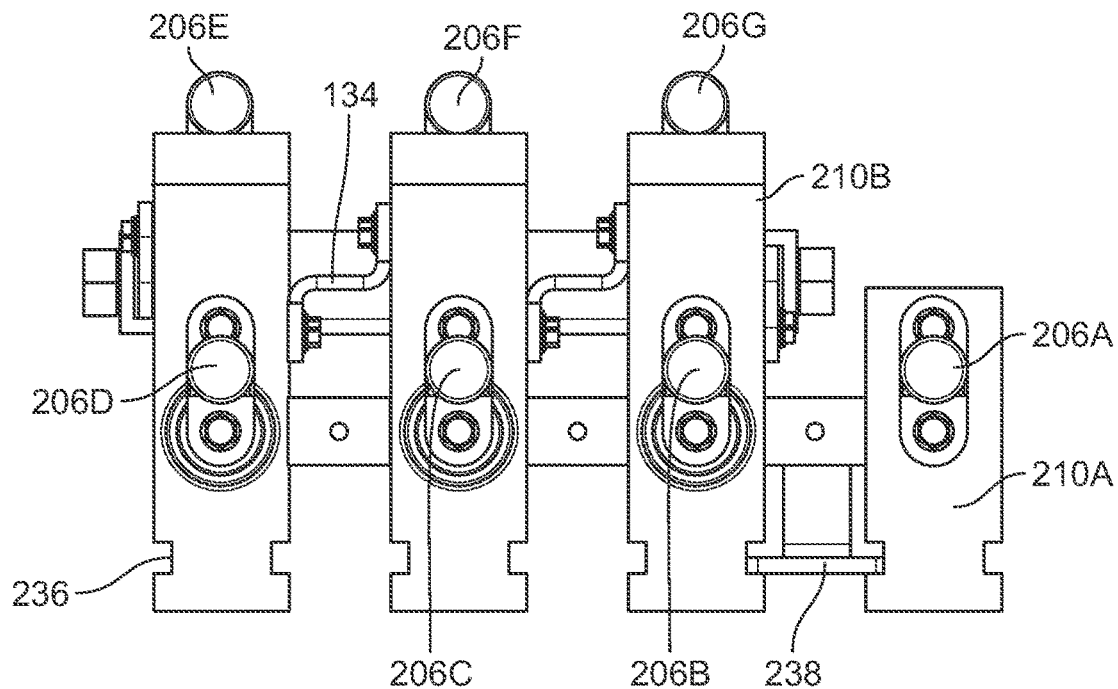
FIG. 32 is a side view of a part of the link box according to the third configuration.
Figure 33:
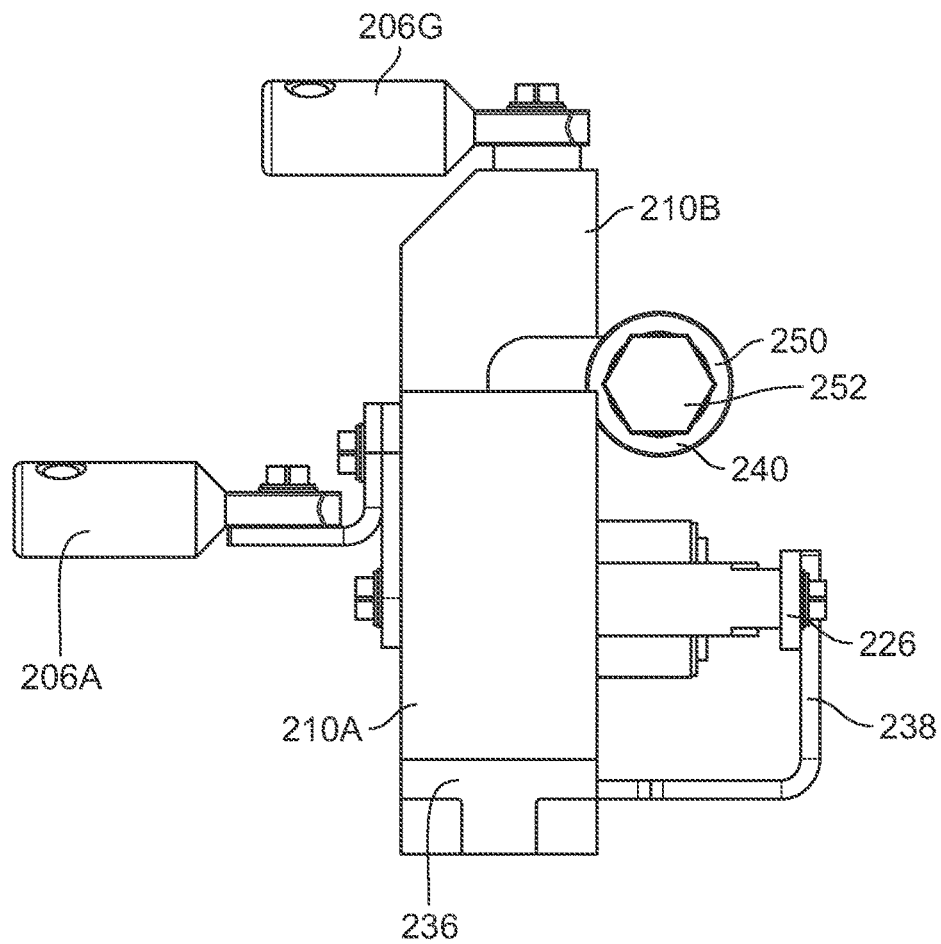
FIG. 33 is another side view of a part of the link box according to the third configuration.
Figure 34:
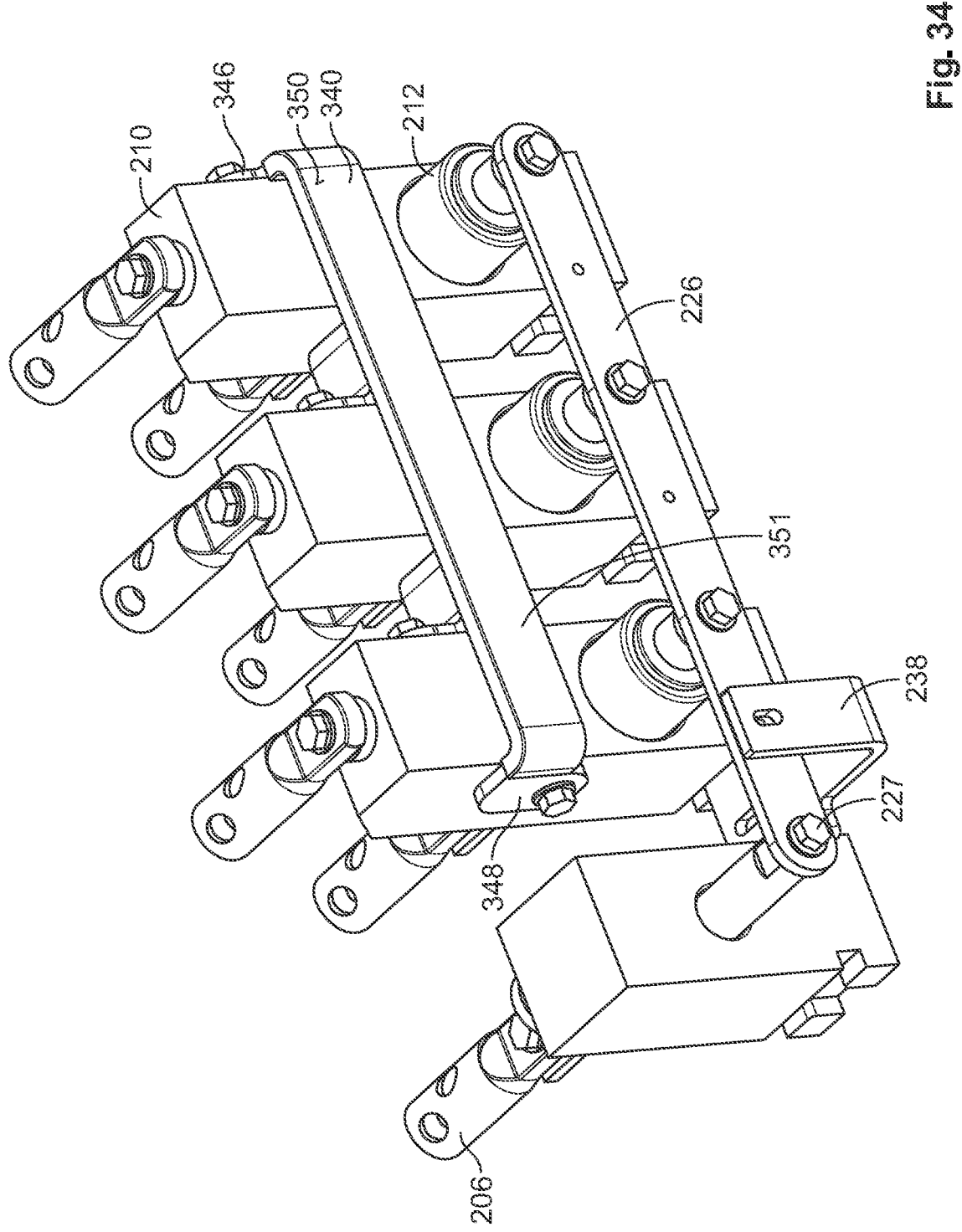
FIG. 34 is a perspective view of a part of the link box according to a fourth configuration.
Figure 35:
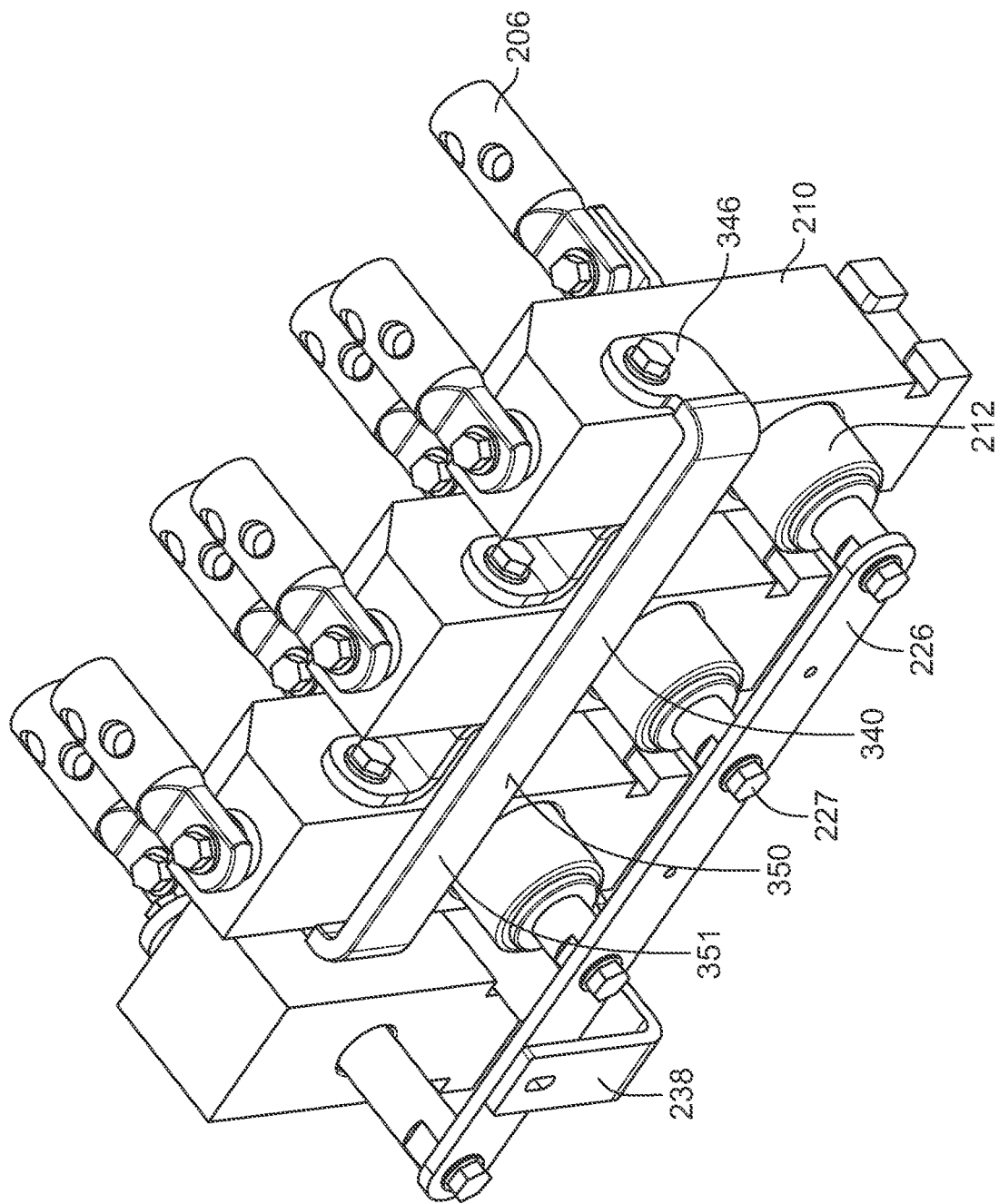
FIG. 35 is a further perspective view of a part of the link box according to the fourth configuration.
Figure 36:
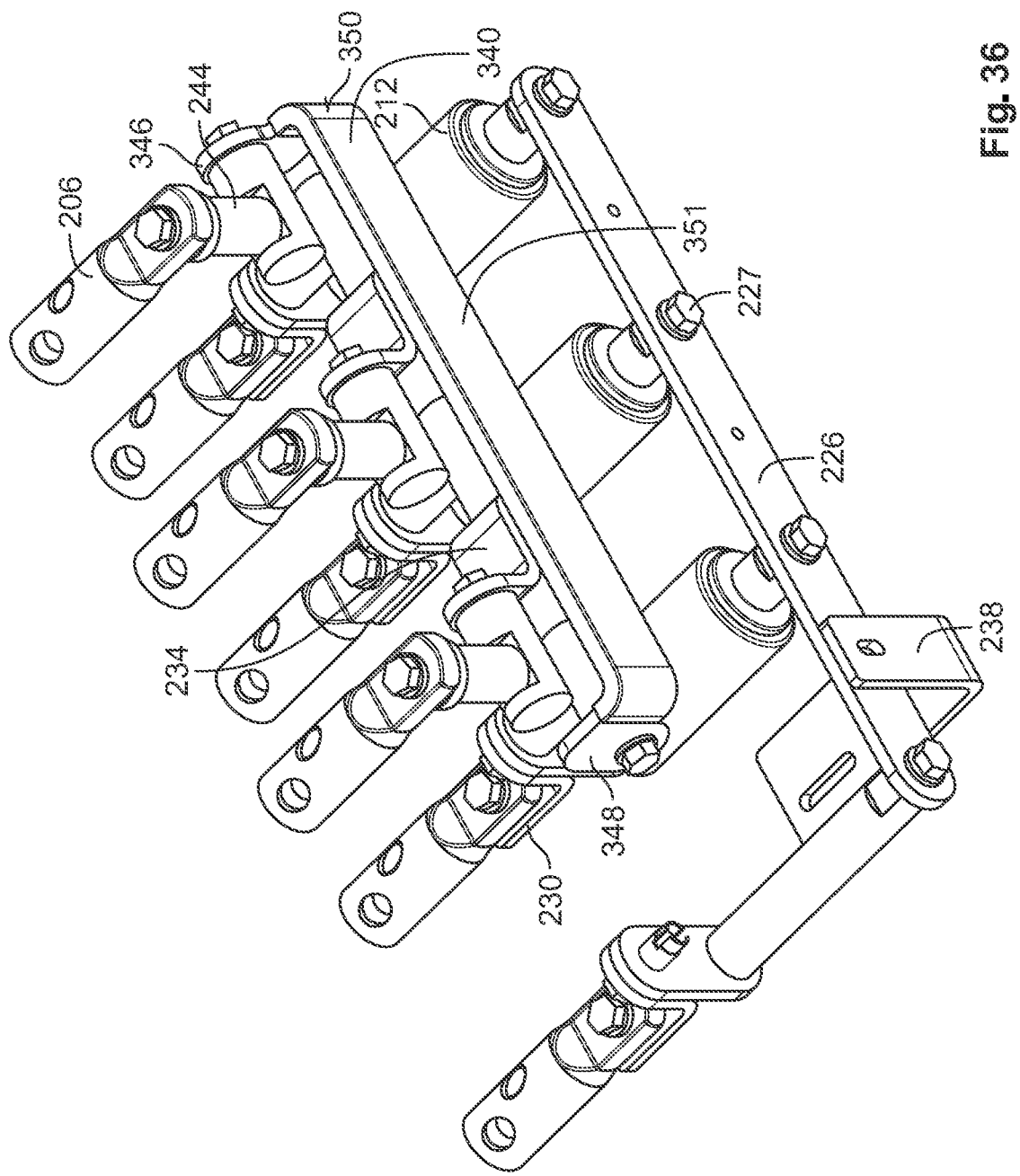
FIG. 36 illustrates the conductive parts of the configuration shown in FIGS. 34 and 35.
Figure 37:
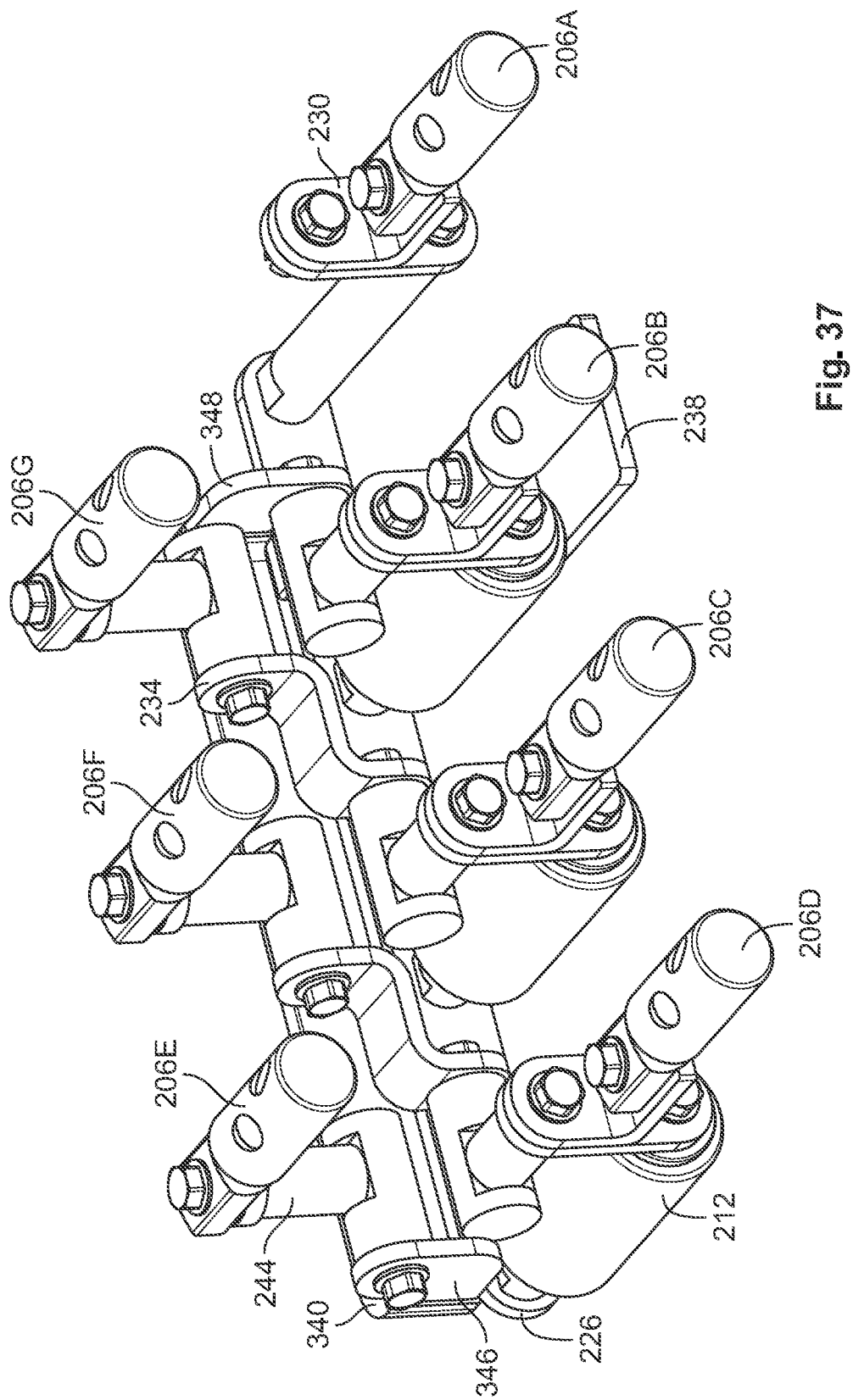
FIG. 37 is another perspective view of the conductive parts shown in FIG. 36.
Figure 38:
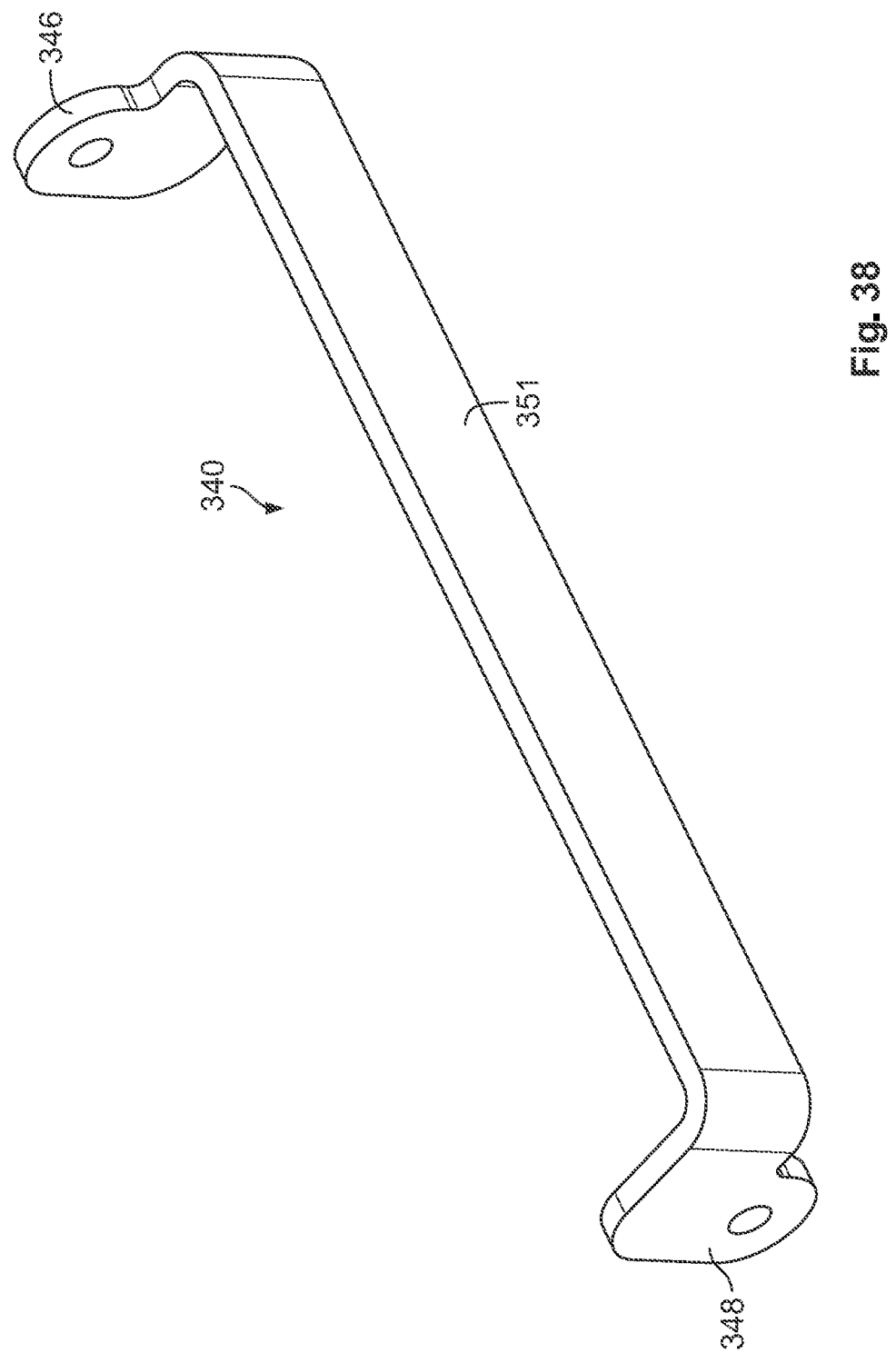
FIG. 38 is a perspective view of an integrally formed cross bar.

FIGS. 32 and 33 show two side views (rotated by 90°) of the electrically conductive parts mounted at the carrier elements 210. While the multi-part second cross bar 240 has more mechanical flexibility to adapt to tolerances of the mounted and rigidly interconnected carrier elements 210, it comprises a plurality of parts which are expensive to manufacture. Consequently, FIGS. 34 to 38 illustrate an alternative example of the present disclosure where a second cross bar 340 is used that is integrally formed from a twice angled metal bar. The connecting links 346, 348 are formed as one single electrically conductive piece with the center region 251.

For avoiding the occurrence of flash-over voltages the second cross bar 340 is partly covered by an electrically insulating material 350, which only leaves uncovered the connecting links 346, 348. The electrically insulating material 350 may for instance be formed by a heat shrink sleeve. Any other suitable insulating covering, such an overmolding or surface coating may of course also be used, as long as the covering is thick enough and covers the angled portions of the cross bar 340 with sufficient precision.

Apart from the differently designed cross bar 340, the other components are the same as previously explained with reference to FIGS. 15 to 33 and will not be described again.

In summary, the sheath-bonding link box according to the present disclosure is built fully modularly so that the same components can be used in a great variety of application environments. The included surge arrester and its length no longer determines the design of the link box due to the use of a tower shaped carrier unit. The electrically insulating carrier unit provides electrical insulation as well as mechanical fixing of all components at the same time, thus rendering the solution fully scalable. Explosion protection is provided for the surge arrester. An optimized electrical performance regarding voltage, current, and electrical field is achieved by the sheath-bonding link box according to the present disclosure. Furthermore, the required volume is significantly reduced.

Due to the modular setup and the fact that the same components can be maintained, an easy installation in the field can be achieved and no design changes are needed for different interconnection configurations or surge arresters.

Although not shown in the figures, additional sensors for voltage, temperature, current, partial discharge, and/or any other type of sensor may be included in the sheath-bonding link box according to the present disclosure. The sheath-bonding link box according to the present disclosure may comprise a control module residing inside or outside the housing, and may have a communication module to communicate sensor data via a communications network to a remote computing device.

The sheath-bonding link box according to the present disclosure is intended to be used with voltages above approximately 1 kV. In particular, the term high-voltage in the context of the present disclosure is intended to comprise the usual nominal voltage ranges of power transmission, namely medium voltage, MV, (about 3 kV to about 72 kV), high-voltage, HV, (about 72 kV to about 245 kV), and also extra high-voltage (up to presently about 500 kV). Of course, higher voltages may be considered. These voltages may be direct current (DC) or alternating current (AC) voltages. In the following, the term "high-voltage cable" is intended to signify a cable that is suitable for carrying electric current of more than about 1 A at a voltage above approximately 1 kV. The "high-voltage cable" can be either a single core or coaxial bonding cable. The present disclosure is also applicable to the so-called "low-voltage", LV, range that relates to voltages below 1 kV.

Finally, it is noted that any values or specific characteristics of the described electric and electronic components are only intended as examples and may of course be varied as necessary in order to adapt the circuitry to the particular needs of a specific application environment.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A sheath-bonding link box, comprising:
a housing defining an interior space;
a plurality of electrically conductive connectors extending through the housing between an exterior of the housing and the interior space, the plurality of connectors each having an internal connecting portion positioned inside of the interior space and an external portion positioned outside of the housing, the internal connecting portion being electrically connectable to a functional link in the interior space, the external portion being dimensioned to be electrically connectable to a sheath-bonding lead; and
at least one electrically insulating carrier unit onto which the internal connecting portions of the electrically conductive connectors and the functional links are mounted, the carrier unit includes a plurality of receptacles, each receptacle at least partly receiving one of the functional links in an orientation along a longitudinal axis of the internal connecting portion of each connector, the carrier unit has a plurality of individual carrier elements, one carrier element is associated with each internal connection portion.

2. The sheath-bonding link box according to claim 1, wherein the functional links include at least one of a surge voltage limiter and an electrically conductive passive link.

3. The sheath-bonding link box according to claim 2, wherein the electrically conductive passive link is formed by a metallic bolt.

4. The sheath-bonding link box according to claim 3, wherein the surge voltage limiter includes a high-voltage surge arrester.

5. The sheath-bonding link box according to claim 1, wherein the interior space is sealed from an external environment, and electrically shielded from the outside of the housing.

6. The sheath-bonding link box according to claim 1, further including at least one sensor element positioned inside the interior space and coupled to a control module.

7. The sheath-bonding link box according to claim 6, further comprising a communication module communicating sensor data via a communications network to a remote computing device.

8. The sheath-bonding link box according to claim 6, wherein the at least one sensor element includes at least one of a voltage sensor, a temperature sensor, a current sensor, and a partial discharge sensor.

9. The sheath-bonding link box according to claim 1, wherein the carrier unit is formed by a plurality of parallelepipedal blocks.

10. The sheath-bonding link box according to claim 9, wherein each block has a through-hole forming one of the receptacles.

11. The sheath-bonding link box according claim 1, wherein the functional links each include a connector link connected to the internal connecting portion of one of the connectors.

12. The sheath-bonding link box according claim 11, wherein each connector link is formed by a separate electrically conductive part and extends in a direction across the longitudinal axis of the internal connecting portion of each connector.

13. The sheath-bonding link box according to claim 1, wherein the housing includes a box-shaped body having a base and side walls extending from the base, and a lid releasably attachable to the body.

14. The sheath-bonding link box according to claim 13, wherein the carrier unit is attached to the base such that the internal connecting portion of each connector is attached to a surface of the carrier unit facing away from the base, and/or wherein the receptacles are arranged closer to the base than a center of gravity of the carrier unit.

15. The sheath-bonding link box according to claim 1, wherein at least one cross bar is provided, which is at least partly encompassed with an electrically insulating material.

16. The sheath-bonding link box according to claim 1, wherein each internal connecting portion is mounted on a top of one carrier element.

17. The sheath-bonding link box according to claim 1, wherein the individual carrier elements are each tower shaped.

18. A sheath-bonding link box, comprising:
a housing defining an interior space;
a plurality of electrically conductive connectors extending through the housing, the plurality of connectors each having an internal connecting portion positioned inside of the interior space and connected to a functional link, and an external portion positioned outside of the housing and connected to a sheath bonding lead; and
at least one electrically insulating carrier unit onto which the internal connecting portions of the electrically conductive connectors and the functional links are mounted, the carrier unit has a plurality of individual carrier elements, one carrier element is associated with each internal connection portion.

19. The sheath-bonding link box according to claim 18, wherein the carrier unit includes a plurality of receptacles, each receptacle being adapted to at least partly receive one of the functional links in an orientation along a longitudinal axis of the internal connecting portion of each connector.

20. The sheath-bonding link box according to claim 18, wherein the functional links include at least one of a surge voltage limiter and an electrically conductive passive link.

* * * * *